Dec. 4, 1923.  1,476,361
H. GILES
COIN CONTROLLED VENDING MACHINE
Filed Nov. 17, 1922  11 Sheets-Sheet 1

INVENTOR:
HARVEY GILES,
BY
Charles C. Gill,
ATTORNEY.

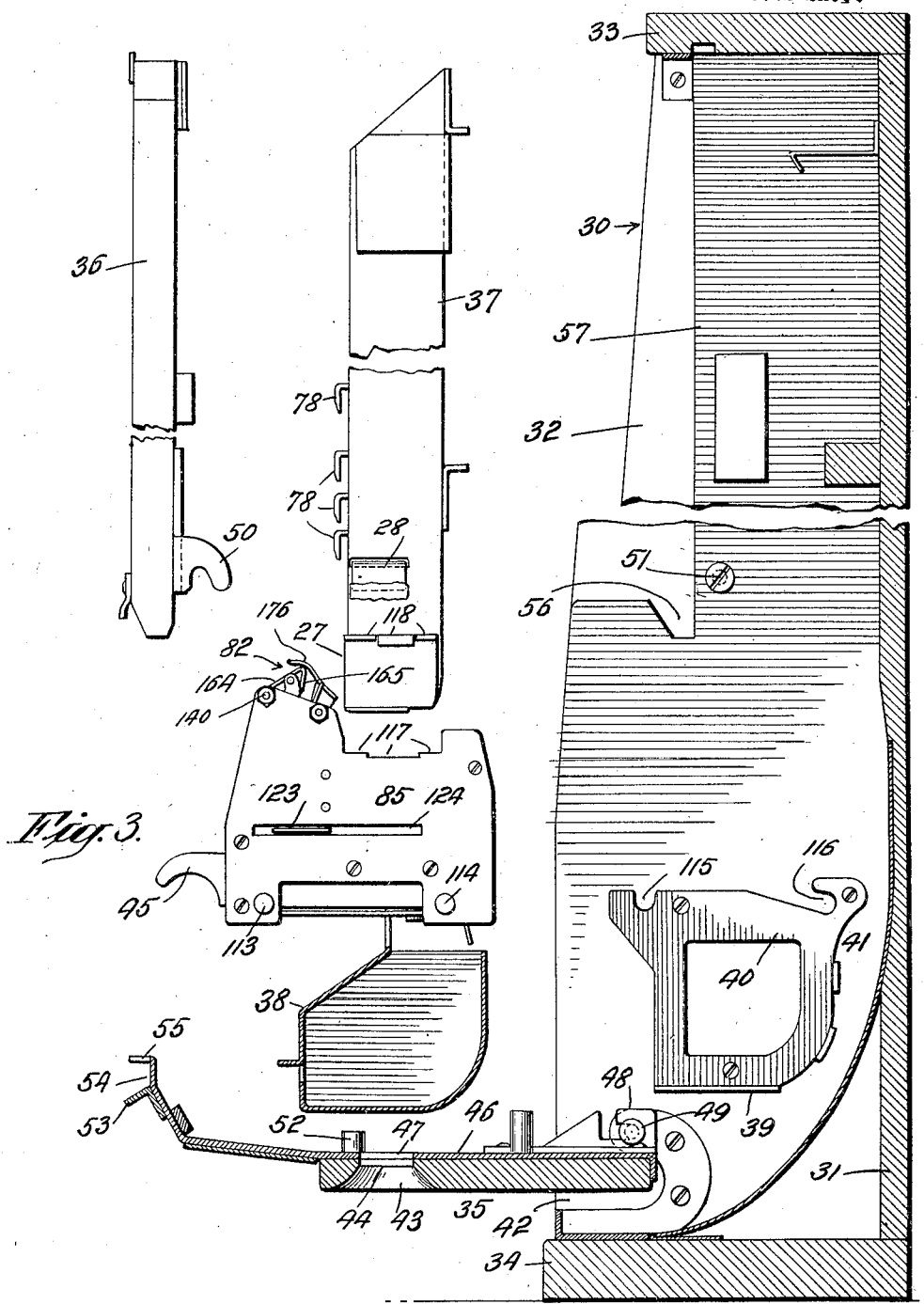

Dec. 4, 1923.　　　　　　　　　　　　　　　　1,476,361
H. GILES
COIN CONTROLLED VENDING MACHINE
Filed Nov. 17, 1922　　　11 Sheets-Sheet 3
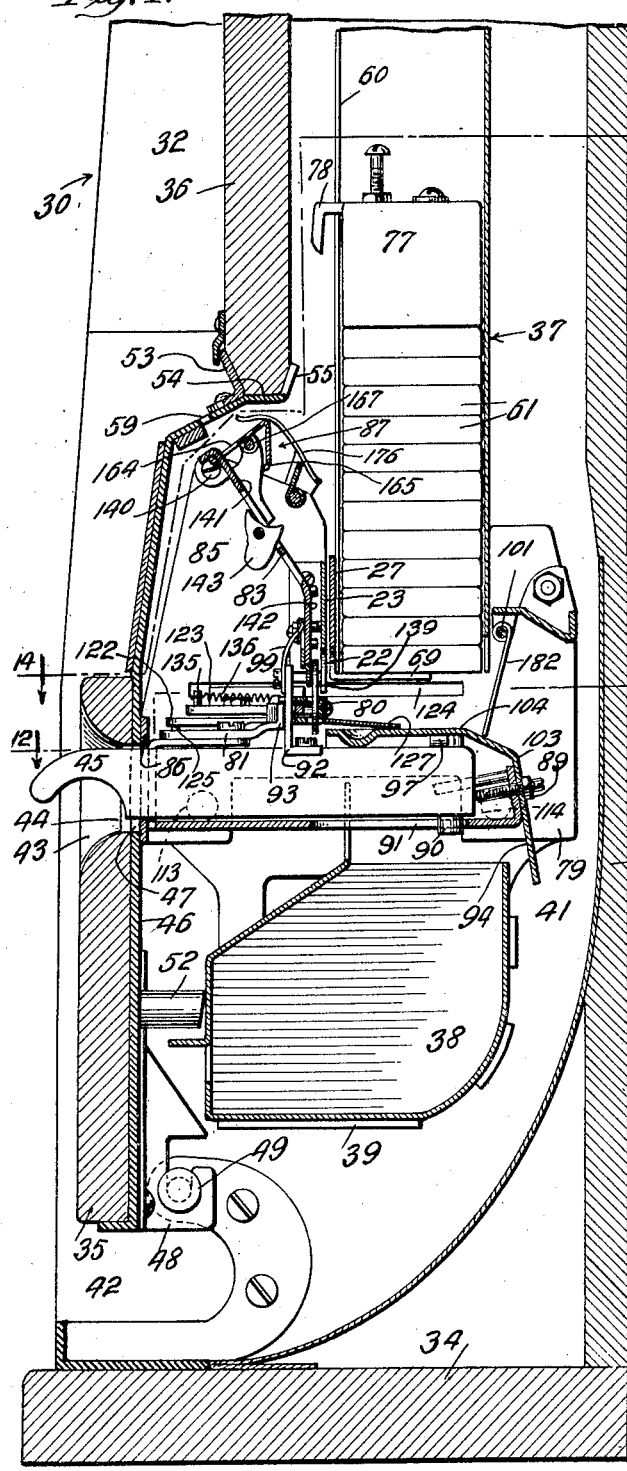
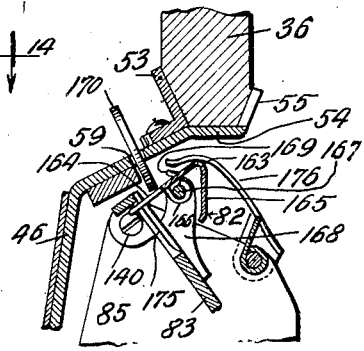
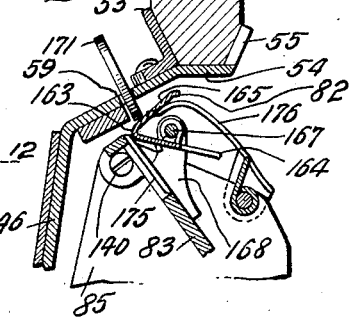
INVENTOR:
HARVEY GILES,
BY
Charles C. Gill,
ATTORNEY.

Dec. 4, 1923. 1,476,361
H. GILES
COIN CONTROLLED VENDING MACHINE
Filed Nov. 17, 1922 11 Sheets-Sheet 4
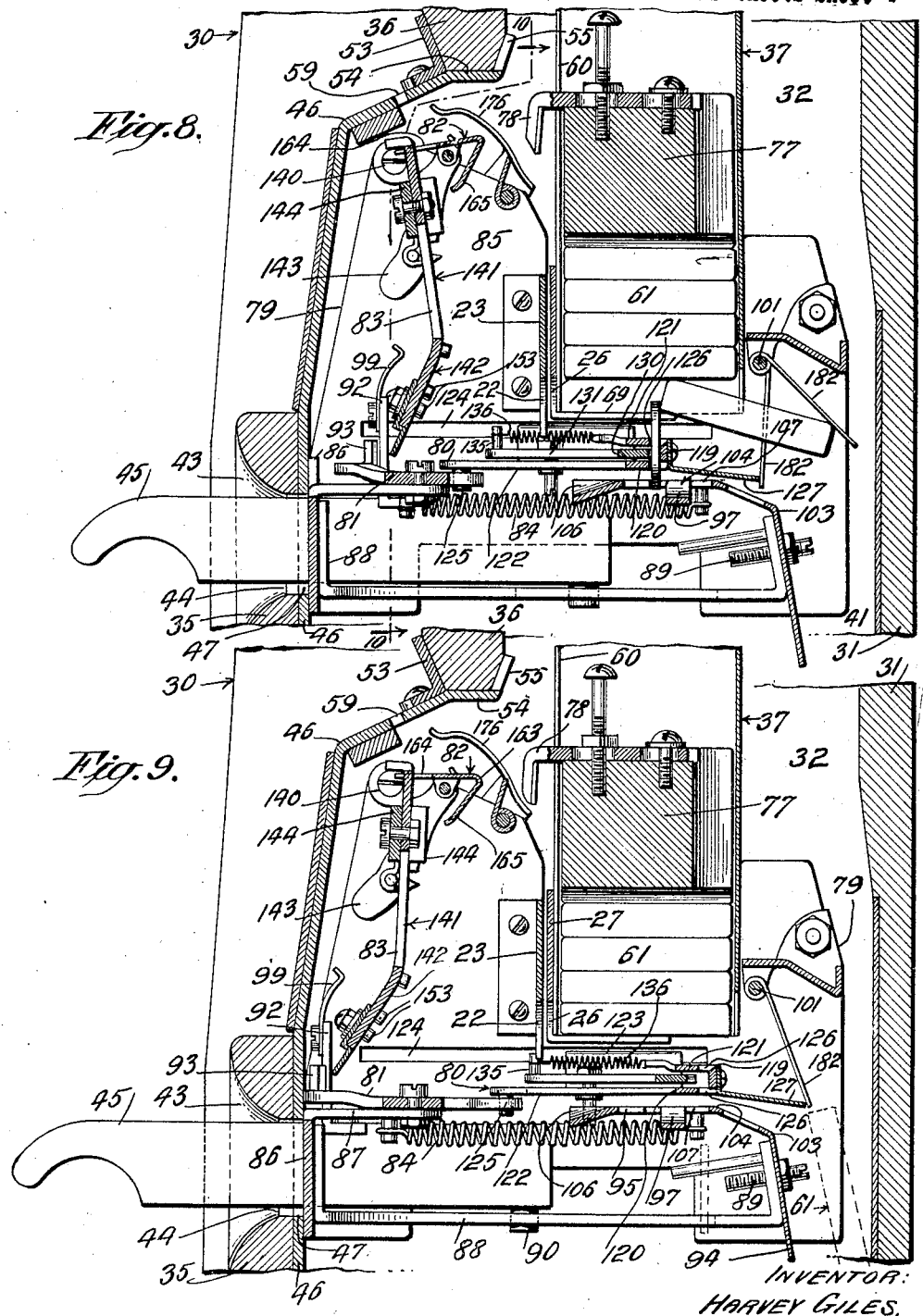
INVENTOR:
HARVEY GILES,
BY Charles C. Gill,
ATTORNEY.

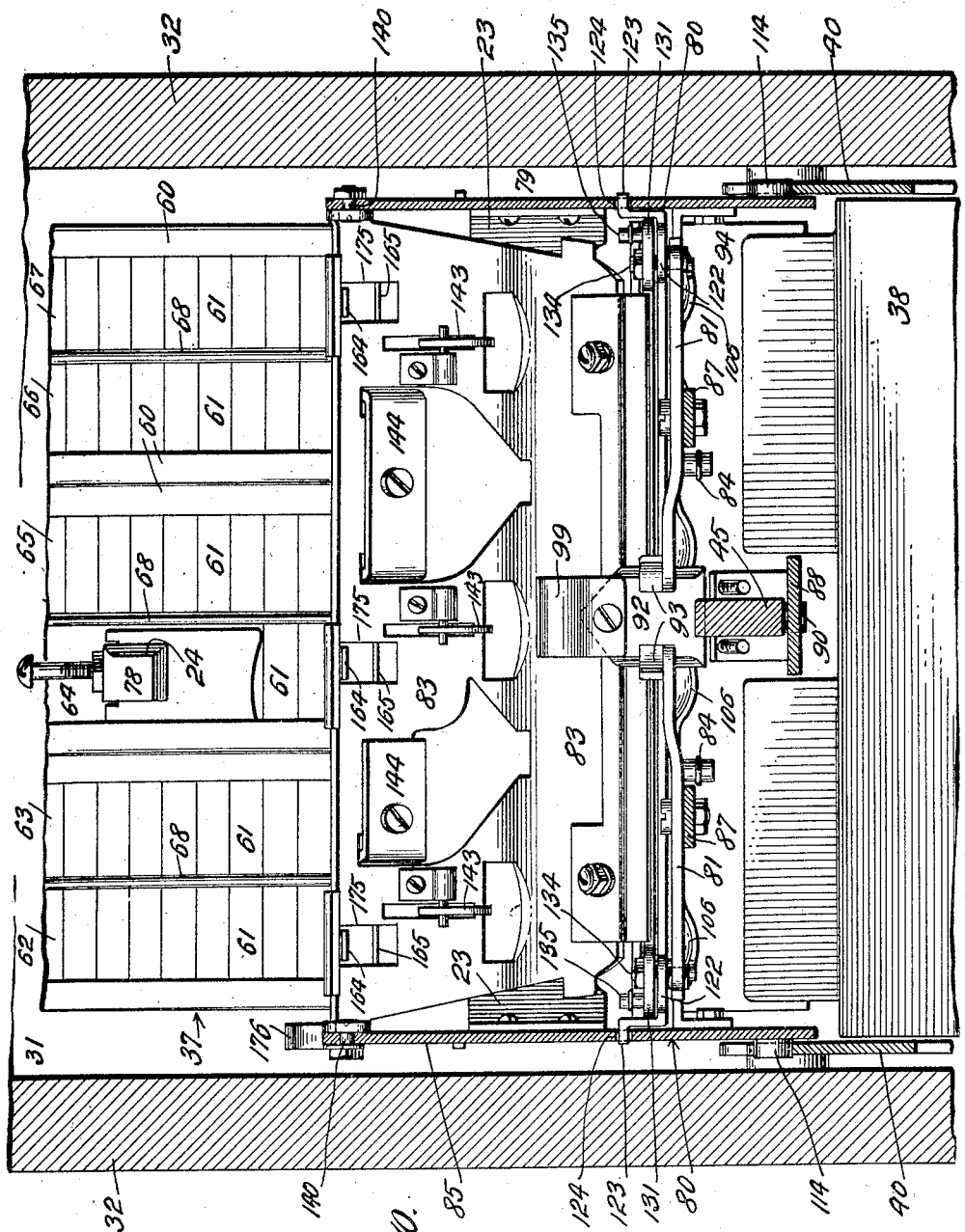

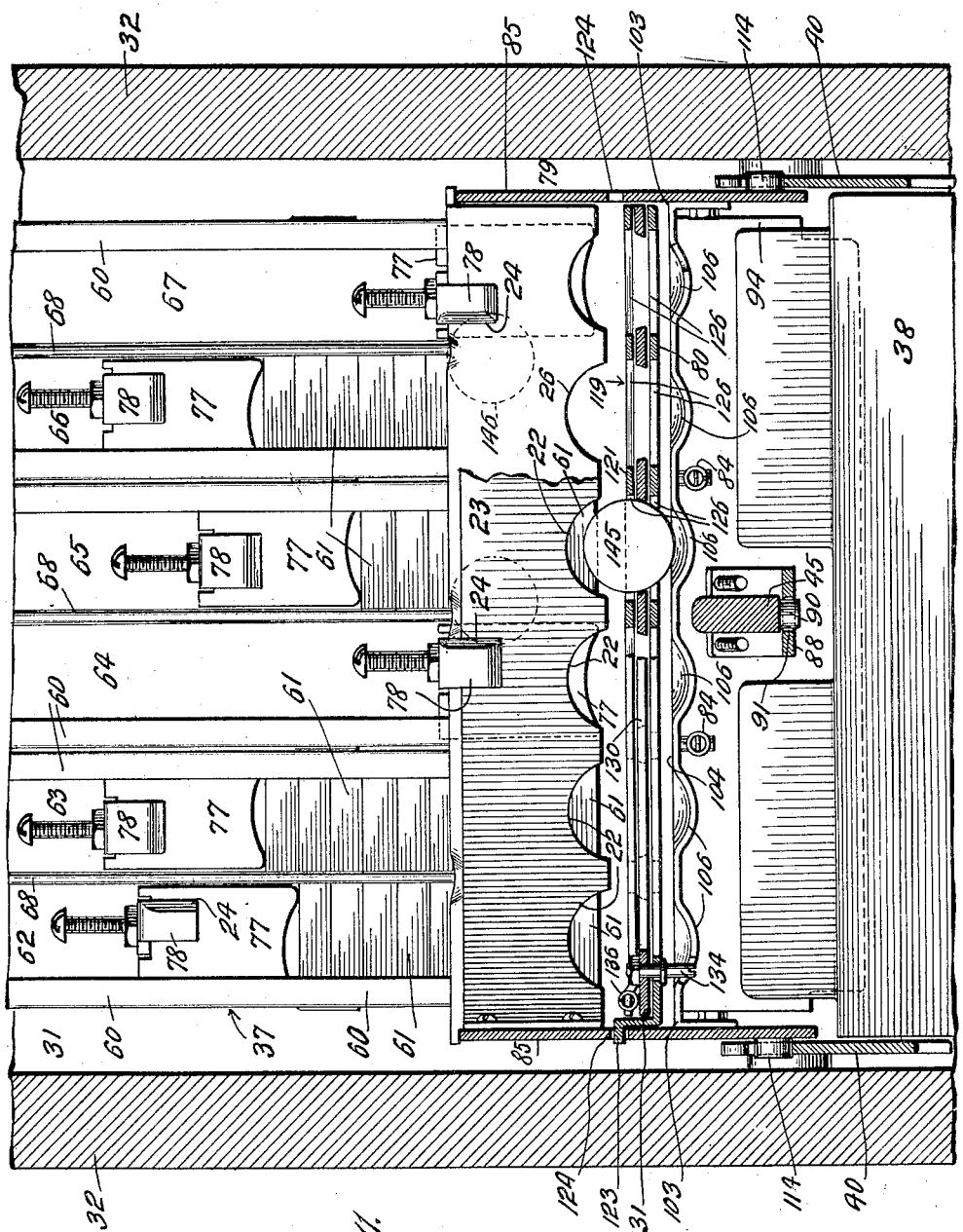

Dec. 4, 1923.
H. GILES
1,476,361
COIN CONTROLLED VENDING MACHINE
Filed Nov. 17, 1922
11 Sheets-Sheet 7
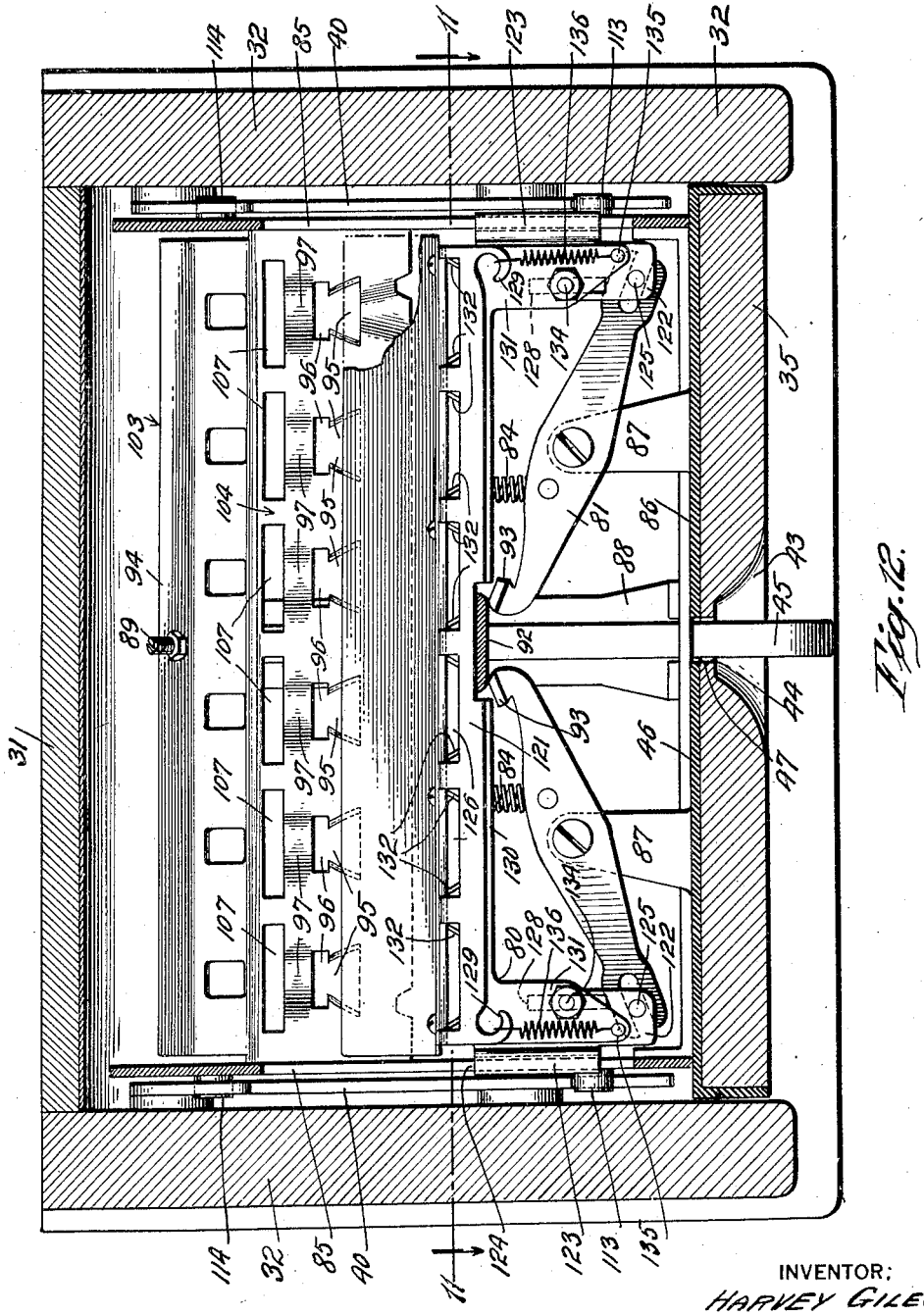
INVENTOR:
*HARVEY GILES,*
BY
*Charles C. Gill,*
ATTORNEY.

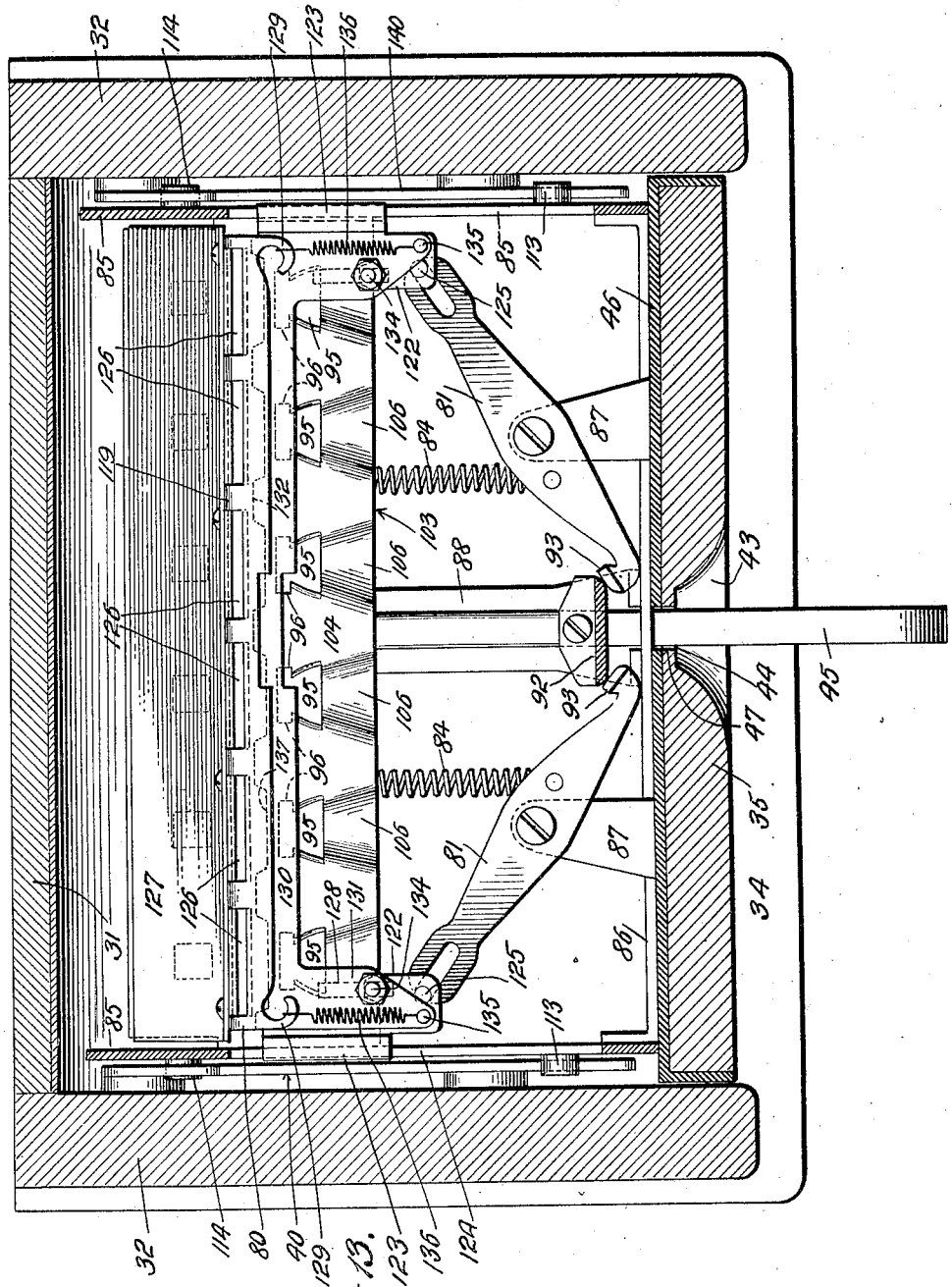

Dec. 4, 1923.
H. GILES
1,476,361
COIN CONTROLLED VENDING MACHINE
Filed Nov. 17, 1922   11 Sheets-Sheet 9
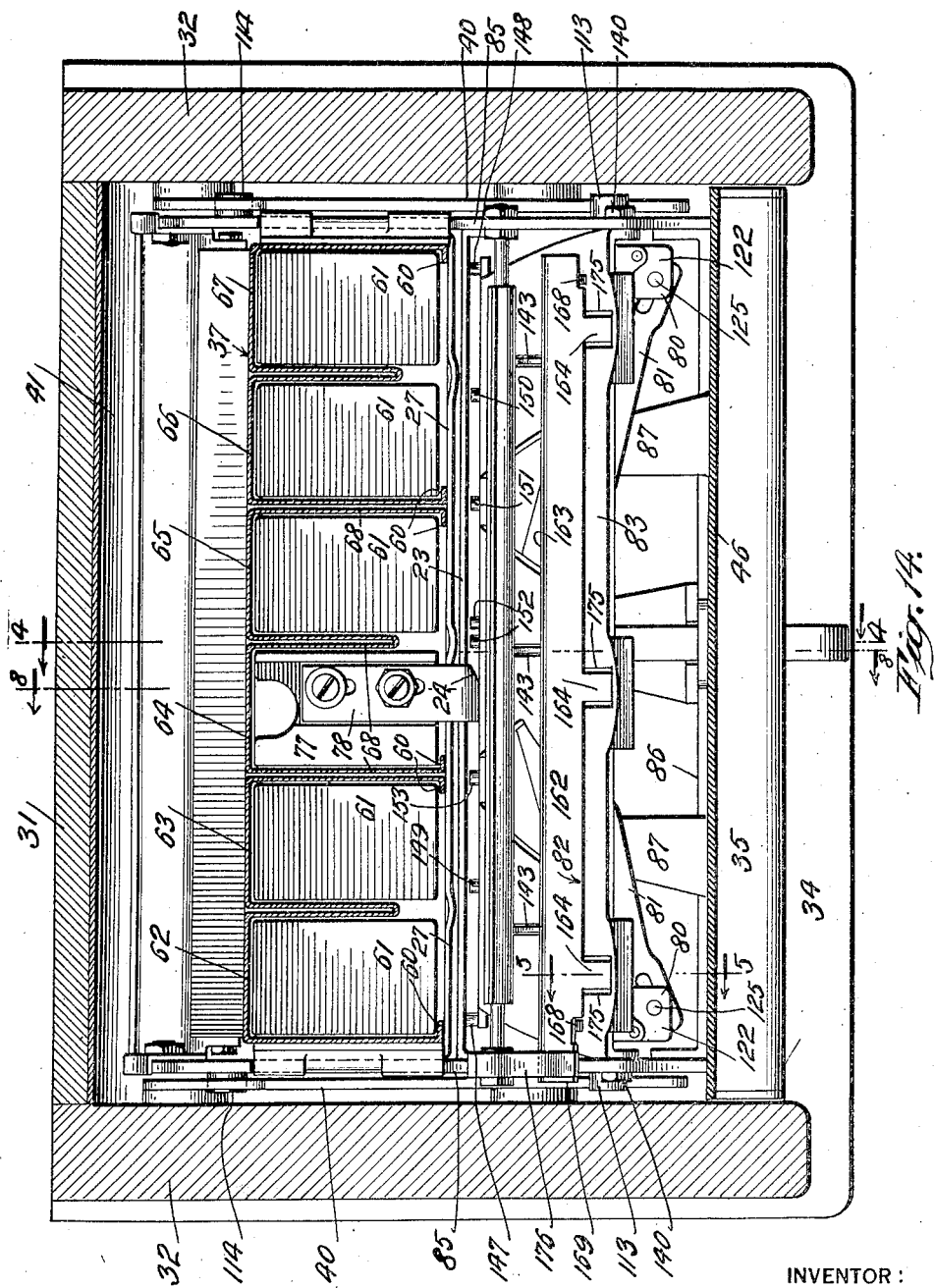
INVENTOR:
HARVEY GILES,
BY
Charles C. Gill,
ATTORNEY.

Dec. 4, 1923.

H. GILES

COIN CONTROLLED VENDING MACHINE

Filed Nov. 17, 1922  11 Sheets-Sheet 10

1,476,361

INVENTOR:
HARVEY GILES,
BY
Charles C. Gill,
ATTORNEY.

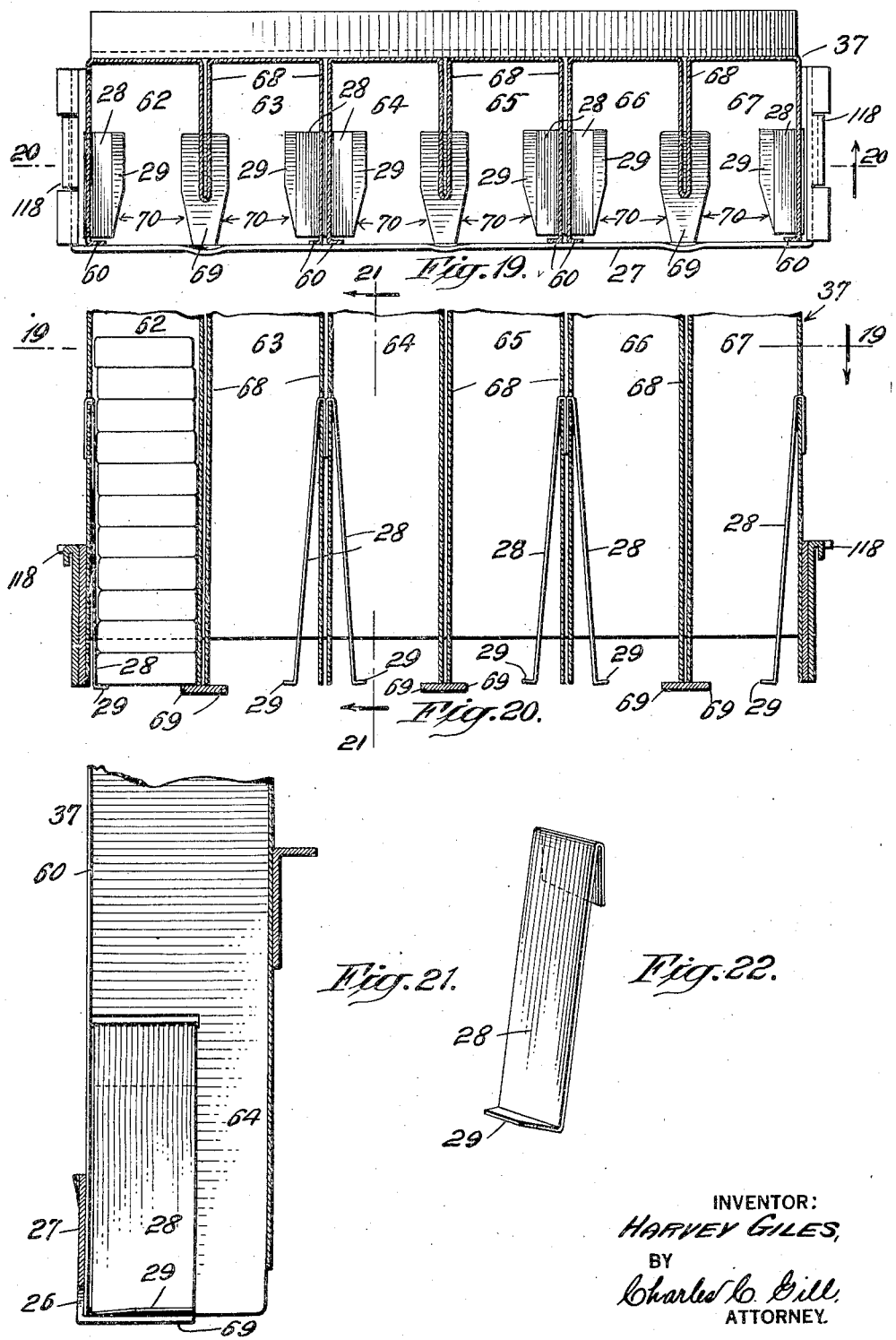

Patented Dec. 4, 1923.

1,476,361

UNITED STATES PATENT OFFICE.

HARVEY GILES, OF BROOKLYN, NEW YORK, ASSIGNOR TO ARTEMAS WARD, OF NEW YORK, N. Y.

COIN-CONTROLLED VENDING MACHINE.

Application filed November 17, 1922. Serial No. 601,482.

*To all whom it may concern:*

Be it known that I, HARVEY GILES, a citizen of the United States, and a resident of Brooklyn, in the county of Kings and State of New York, have invented certain new and useful Improvements in Coin-Controlled Vending Machines, of which the following is a specification.

The invention pertains more particularly to coin-controlled vending-machines for the sale of confections, and it resides in the novel features, structure and combinations of parts hereinafter described, and particularly pointed out in the claims.

The machine of my invention comprises a vertical tray having a series of compartments adapted to receive vertical colums or stacks of the pieces of confection or the like to be sold, an operating handle or rod exposed at its outer end, means operable from said handle in cooperation with introduced coins for ejecting the bottom pieces of confection from the tray, means for directing the sold pieces of confection to an exposed position for the removal by the purchaser, means for collecting the proper coins introduced to the machine, such as one cent pieces, and other features which will be hereinafter fully described.

Usually the vertical trays provided in coin-controlled vending machines designed for selling pieces of confection have had a series of vertical compartments for holding columns or stacks of the confection, and more frequently these machines have had four of such compartments and the pieces of confection have been so placed in them that their side edges faced frontwardly and rearwardly and were engaged by the ejector means. One feature of my present invention is to provide a machine having six compartments for six columns of the merchandise arranged within the same width that has heretofore been occupied by a tray having four compartments. In carrying out this portion of my invention I so arrange the compartments that the side edges of the pieces of confection extend laterally and that the ejector means engage the ends of said pieces instead of the sides thereof, my ejector mechanism, rendered operative when a coin is present, being adapted for a machine having the merchandise compartments arranged in the manner I have just mentioned.

It has been found that machines of the class to which my invention pertains are so complex and delicate in their mechanisms as to entail considerable loss to the owners for repairs and annoyance to purchasers in the loss of coins introduced to the machine which have become out of order. One object of my invention is to provide a vending machine of the class referred to which will be of such particular construction and durable character as to minimize the necessity for repairs and also minimize the danger of disarrangement of the mechanism by persons violently actuating the exposed operating rod or handle. In carrying out my invention I not only economize space within the exterior casing or cabinet by my particular arrangement of the compartments for the merchandise, but I seek to provide a thoroughly operative and reliable mechanism having but few moving parts, these parts serving to position the introduced coins to be used as coin ejectors and to carry the coins against the bottom pieces of confection in the compartments of the tray, for the purpose of ejecting such pieces from the tray, whence they descend to the purchaser. The details of construction of my machine are such that although I provide a machine having six vertical compartments for merchandise, the casing of the machine requires but three entrance slots for coins, one slot serving for coins for two of the vertical compartments.

The coin-controlled mechanism of my invention comprises various features and details of construction and arrangement, all of which will be better understood from the specific explanation thereof hereinafter presented, with reference to the accompanying drawings, in which.

Figures 1, 2:
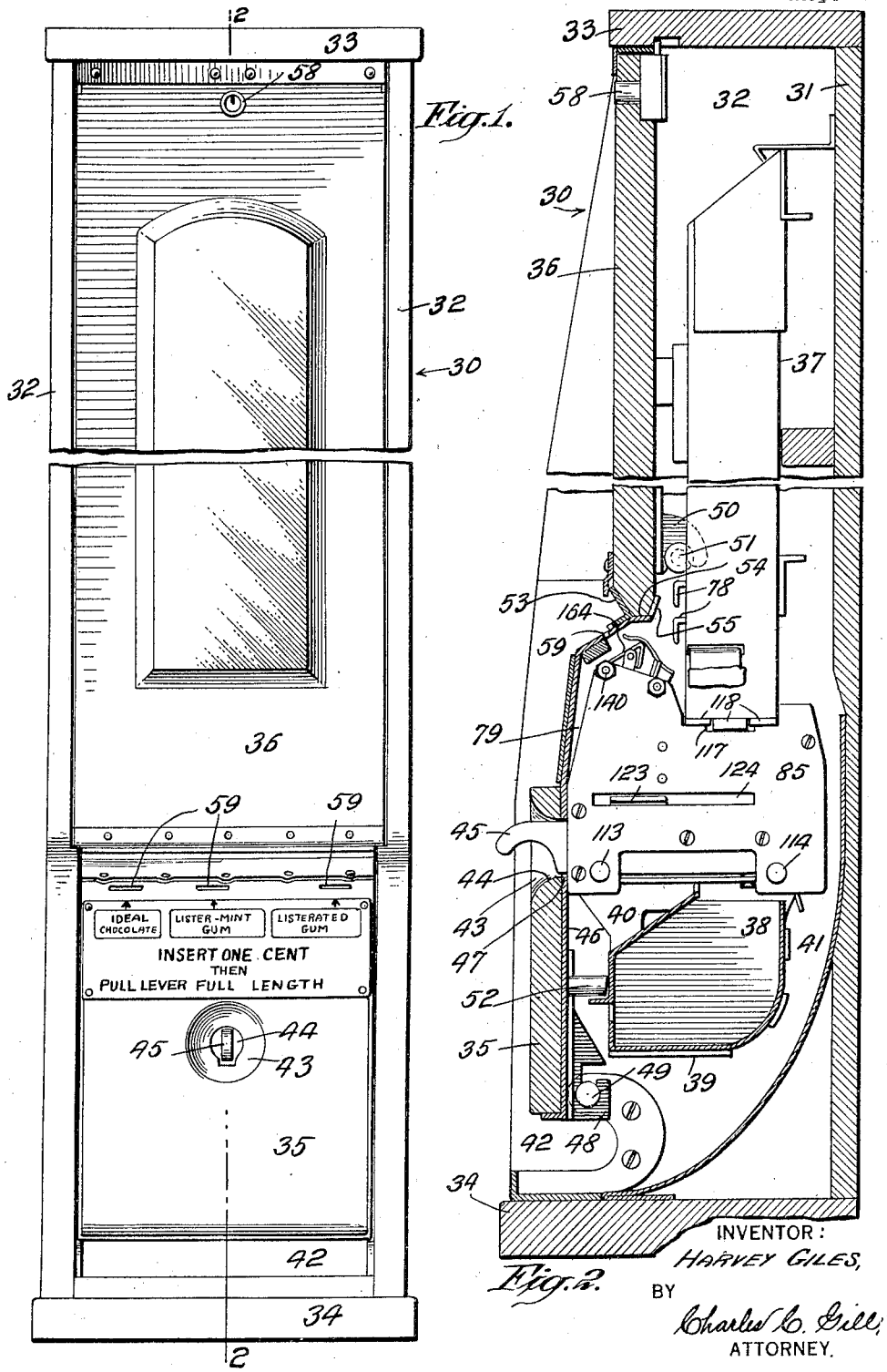
Fig. 1 is a front elevation, partly broken away, of a coin-controlled vending machine constructed in accordance with and embodying my invention.
Fig. 2 is a vertical section, partly broken away, through the same, taken on the dotted line 2—2 of Fig. 1.
Figure 15:
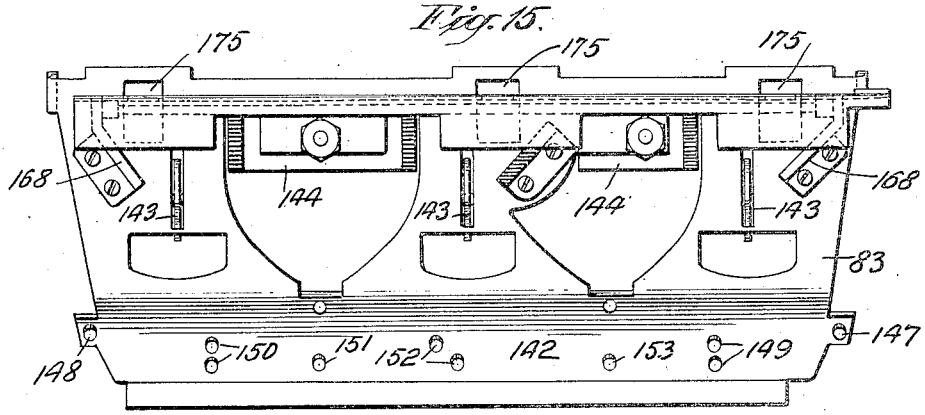
Figure 16:
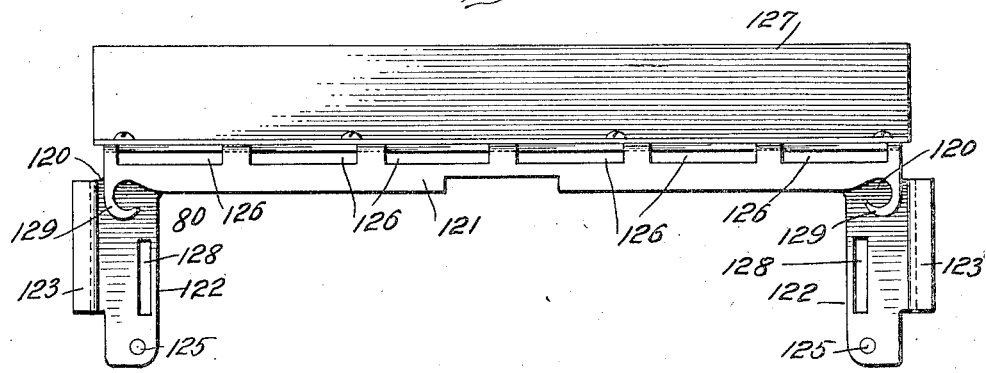
Figure 17:
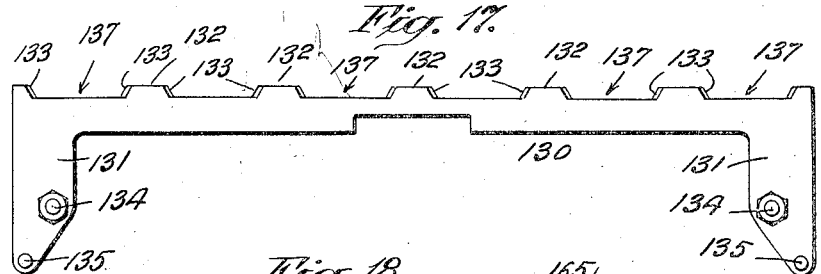
Figure 18:
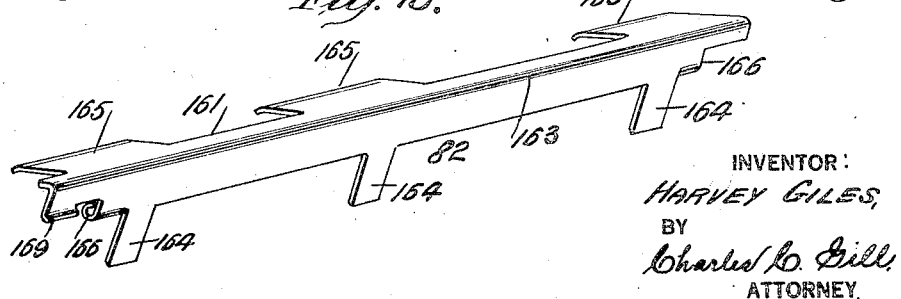

Fig. 3 is a substantially corresponding view illustrating the several removable sections of the machine as separated from the exterior casing or ready to be introduced into said casing, said removable sections consisting of the coin mechanism to be handled as a unit, the coin receiving receptacle located below the same, the merchandise tray disposed above said coin mechanism, the lower front door for closing the lower end of the machine, and the upper front portion or door which normally stands at the front of the merchandise tray;

Fig. 4 is a vertical section, partly broken away and on a larger scale, through the lower portion of the machine, taken on the dotted line 4—4 of Fig. 14 and showing all the parts of the mechanism in their normal inoperated position but with a coin shown as having been fed to the machine and become arrested in position for use in ejecting the bottom piece of confection from the compartment of the tray in line with it on the subsequent operation of the machine by an outward pull on the exposed end of the operating rod or handle;

Fig. 5 is a vertical section through a portion of the machine at one of the coin entrance slots and illustrates a tiltable shutter member in its initial position in the path of a coin entered through the coin slot, said coin being shown as engaging said member and serving on its further passage inwardly to give the shutter member a partial rotation whereby a solid portion thereof will pass below the coin entrance slots to prevent the entrance of further coins until the main operating rod or handle has been moved to deliver the article purchased by said coin and returned to its initial position, the section being on the dotted line 5—5 of Fig. 14;

Fig. 6 is a corresponding view illustrating the tiltable shutter member in the position it takes when the coin shown in Fig. 5 is pressed against it and passes downwardly into the machine, Fig. 6 also indicating how an additional coin shown therein is excluded from passage into the machine, being barred by a solid portion of said shutter and said shutter then being incapable of turning or tilting action under the pressure of said additional coin;

Fig. 7 is a further corresponding view of the same and illustrates the position the aforesaid shutter automatically takes while the main operating rod or handle is returning to initial position and before it has reached such position, said shutter when the said rod has reached said position being in its initial position shown in Fig. 5;

Fig. 8 is a section corresponding generally with Fig. 4 but taken on the dotted line 8—8 of Fig. 14, and illustrates the mechanism as having been partly operated and the lower piece of confection as having been partly ejected by the movement of the coin against the end of the same;

Fig. 9 is a section corresponding with Fig. 8 but illustrating the mechanism as having been completely operated by the outward pull of the operating rod or handle, the ejected piece of confection being indicated by dotted lines and the coin being indicated as having been released and descending to the coin-box;

Fig. 10 is a vertical section, partly broken away, through the front portion of the machine, taken on the dotted line 10—10 of Fig. 8 and illustrating the several parts of the mechanism in their partly operated position, shown in Fig. 8;

Fig. 11 is a vertical section, partly broken away, through a portion of the machine, and said section is taken adjacent to the front of the tray and on the dotted line 11—11 of Fig. 12;

Fig. 12 is a horizontal section through the machine, taken on the dotted line 12—12 of Fig. 4, the mechanism being shown in its normal inoperated position;

Fig. 13 is a sectional view corresponding with Fig. 12, but showing the mechanism as having been operated by an outward pull of the operating rod or handle;

Fig. 14 is a horizontal section through a portion of the machine, taken on the dotted line 14—14 of Fig. 4;

Fig. 15 is a detached rear face view of an oscillatory plate down which the introduced coins slide to their initial operative position, said plate being shown in front elevation in Fig. 10;

Fig. 16 is a detached top view of a horizontal slide or frame having a vertical coin space for each column in the tray and which is used to carry the introduced coins rearwardly from their initial operative position to and against the bottom pieces of merchandise to be discharged from the tray and also to carry the coins beyond the influence of the coin tester slide and to the point at which they are released to descend into the coin box;

Fig. 17 is a detached top view of a coin-tester slide and support, this slide and support being, in use, located over the two slotted forward side members of the slide shown in Fig. 16 and extending at its rear edge portions below the series of coin spaces, six in a line being shown, formed in said slide shown in Fig. 16; the slides shown in Figs. 16 and 17 move rearwardly together to carry a coin against and to discharge a piece of merchandise and then the tester slide becomes arrested and the slide of Fig. 16 continues in movement beyond the rear portion of the tester slide (Fig. 17) to carry the coin to its final releasing position;

Fig. 18 is a detached perspective view of the tiltable shutter for the coin entrance slots;

said shutter being shown in several of its positions in Figs. 5, 6 and 7;

Fig. 19 is a horizontal section through the mechandise tray taken on the dotted line 19—19 of Fig. 20;

Fig. 20 is a vertical section, partly broken away, through the same taken on the dotted line 20—20 of Fig. 19;

Fig. 21 is a vertical section through a portion of the same taken on the dotted line 21—21 of Fig. 20, and Fig. 22 is a detached perspective view of one of the spring side members with which I equip the compartments of the tray.

In the drawings, 30 designates the exterior casing of the machine as a whole, said casing comprising a back 31, sides 32, a top 33, a bottom 34, a lower hinged front door or section 35, and a removable front or door 36. In the rear of the door 36 is formed a chamber for a tray, numbered as a whole 37, for holding the stacks or vertical columns of confections, and within the lower portion of the casing is formed a chamber for the operative mechanism of the machine and also for a coin receptacle 38 which receives the coins after they have left the operative mechanism and from which coins may be removed, when desired, after the front 36 has been removed to free the lower front section 35 so that it may be turned downwardly and forwardly, or to the position shown in Fig. 3, which also shows the coin receptacle 38 as having been withdrawn from the casing of the machine. When in the machine the coin-receptacle 38 rests upon inwardly turned flanges 39 formed at the lower ends of cheek plates 40 secured to the sides 32 of the main casing. At the rear of the coin-box or receptacle 38 is provided a chute 41 down which the pieces of confection dislodged from the tray may slide to an opening 42 below the front section 35 of the casing and from which opening said pieces may be removed by hand.

The lower front section 35 is preferably of metal and faced on its exterior by a block of wood, as shown, having a recess 43 therein for the fingers of the operator and a slot 44 through which the operating rod or handle 45 may be moved forwardly and rearwardly. The metallic portion of the front section 35 is numbered 46, and it has a slot 47 in line with the aforesaid slot 44 through which the operating rod or handle 45 may have its movement. The lower opposite edges of the plate 46 are formed or provided with ears 48 to engage headed pins 49 secured to the sides of the main casing 30, said ears being slotted to pass upon said pins and therewith serve to hinge the front section 35 to the casing, said section being removable, however, by reason of the formation of the slots in said ears 48. The upper end of the plate portion 46 of the front section 35 is bent rearwardly, as shown in Figs. 2 and 4, to close over the operative mechanism of the machine and to afford a shelf receiving the lower edge of the front 36. When the section 35 is in its upper or closed position a pin 52 carried thereby engages the front of the coin-box 38 and thereby serves to retain said coin-box in position between the cheek plates 40.

The upper portion of the plate 46 has a bar 53 secured to it, and at the rear of said bar 53 said plate 46 is bent rearwardly to form a horizontal shelf 54 from which ears 55, two ears being sufficient, extend upwardly to stand substantially parallel with the bar 53. The front 36, when in position, rests upon the shelf 54 and is rigidly held against forward and backward movement between the bar 53 and ears 55. The sides 32 of the main casing are provided in line with the space or opening formed between the bar 53 and ears or lugs 55 with recesses 56 (Fig. 3) adapted to receive the lower side edges of the front 36 and thereby act to lock the lower edge of said front 36 in position, said front when in position serving, by its engagement with the plate 46, to lock the front section or door 35 in closed position. After the front 36 has been moved downwardly into the recesses 56 and upon the seat 54 afforded by the plate 46, said front will, at its upper portion, be pressed inwardly between the sides 32 of the main casing and against vertical shoulders 57 formed thereon, and finally said front 36 will be secured at its upper end to the casing by means of any suitable lock 58, as is customary. The front 36 may also be provided with other detail features for securing it in position, as, for illustration, hooks 50 to engage over headed screws 51 secured to the sides of the casing (Figs. 2 and 3).

The upper portion of the plate 46 is formed with coin entrance slots 59, three of said slots in the present instance being made use of, and one slot being for each two vertical sections or compartments of the main tray 37.

The tray 37 has a back and sides, as usual, and also front laterally extending flanges 60 to aid in retaining the stacks of pieces of confection, numbered 61, in position. In the present instance the tray 37 contains six vertical compartments numbered, respectively, 62, 63, 64, 65, 66 and 67, these compartments being arranged in pairs, as shown in Figs. 10, 11, 19, and separated by vertical partitions 68. The compartments of the tray 37 are narrow, and the pieces of confection 61 placed therein are arranged endwise instead of sideways, the ends of the pieces facing frontwardly and rearwardly, whereby as compared with the usual arrangement of confection in the trays of vending machines, I economize space, and in the present instance secure six vertical compartments in the width of tray ordinarily affording only four compartments. It is advantageous, outside of the question of economy of space, to arrange the pieces of confection endwise, because thereby the ejector means is enabled to engage a substantial part of the exposed end of the piece to be ejected instead of engaging said piece at the middle of one of its longer side edges. The action is more efficient and less liable to derangement when the ends of the pieces of confection are engaged by the ejector means, than when the side edges of said pieces are so engaged, and this advantage, in addition to the economy of space, is quite important.

At the bottom of the tray 37 I provide flanges 29, 69, respectively, (Figs. 19, 20, 22) to serve as supports for the stack of pieces of confection 61, and these flanges at their forward facing portions are on rearwardly converging lines, as indicated at 70 in Fig. 19, so as to form enlargements of the spaces between the forward portions of said flanges to permit a coin facing rearwardly and employed as an ejector, to readily pass between said flanges until the rear portions of the converging edges thereof are reached by the coin, and so that thereafter, the coin passing rearwardly, will be engaged by the edges of the flanges and be thereby pressed downwardly, leaving only a limited upper portion of the coin extended upwardly between the rear parallel portions of said flanges. The flanges 29 are formed on the lower edges of depending spring plates 28. There is one of these plates 28 in each compartment of the tray, and each plate is secured at its upper end and normally flexes against the side of the column of pieces 61 in the compartment, as shown at the left hand side of Fig. 20. The spring plates 28 impart a steadiness to the column of pieces 61, which I deem to be desirable in that this pressure against the side of the stack of pieces serves to impart a firmness to the stack which keeps the pieces from having any tilting movement and assures the proper discharge of one piece after another without the piece being discharged, disturbing the piece above it. The spring plates may be used or not as may be preferred, and in the absence of the spring plates 28 the lower edges of the compartments would be provided with the usual supporting flanges for the edges of the pieces of merchandise.

At the lower front portion of the tray 37 and secured thereto, is a plate 27 having coin-entrance openings 26 in line with the bottoms of the tray-compartments and lower edge members extending rearwardly therefrom below the partitions 68 and forming the supporting flanges 69.

Upon the stacks of confection 61, I place weights 77 having forwardly and then downwardly projecting hook-like arms 78, some of said arms being beveled on one vertical edge, as at 24, as shown in Fig. 11. The weights 77 serve to press the pieces of confection downwardly, and when the last piece of confection downwardly, and when the last piece of confection in any compartment has been sold, the arm 78 of the weight in said compartment will project downwardly over the upper front surface of a stationary transverse coin-guide and positioning plate 23, as I show in two instances in Fig. 11. The plates 23 and 27 are parallel with each other and stationary, and the plate 23 has coin-entrance openings 22 in line and corresponding with the coin-entrance openings 26 in the plate 27. The beveled edges 24 on the arms 78 cooperate with certain pins, hereinafter identified, in deflecting introduced coins from a compartment which has become empty to the foot of an adjoining compartment from which sales may still be made, and when two adjoining compartments have become empty, the arms 78 of the weights in said two compartments stand in position to arrest an introduced coin reaching them, said coin on the movement of the operating rod or handle 45, being freed to return to the purchaser.

That portion of the machine which may be designated as the operative mechanism and which is located above the coin receptacle 38 and partly below the upper inwardly turned portion of the lower front door 35 and partly below the main tray 37, may be handled as a unit, and this mechanism comprises a stationary main supporting frame numbered as a whole 79, a slidable frame or carriage 80 mounted thereon, a pair of levers 81 loosely connected at their outer ends with said frame or carriage 80 and at their inner ends having a pivotal bearing connection with the main operating rod or handle 45, a hinged rockable shutter 82 (Figs. 5, 6 and 7) and a hinged coin-plate 83 hung from its upper end from the upper forward portion of the main frame 79. The carriage 80 is equipped with means, hereinafter described, for supporting and carrying the coins against the pieces of confection at the bottom of the tray 37, and said carriage 80 has a direct rearward and forward movement, the movement toward the rear and toward the lower end of the tray 37 being caused by an outward pull on the operating rod or handle 45 and the return movement toward the front of said carriage being caused by two coiled springs 84 whose forward ends are connected to the levers 81, as shown in Figs. 8 and 13, and whose rear ends are connected to a stationary member of the main frame 79.

The main frame 79 comprises two corresponding vertical side plates 85 which are connected together at their lower front ends by a plate or bar 86 through which the operating rod or handle 45 passes. The plate or bar 86 has two rearwardly extending right angle bracket plates 87 upon which the levers 81 are pivotally mounted, as shown in Figs. 12 and 13. The bar 86 also has secured to it a supporting plate 88 which extends rearwardly, as shown in Fig. 8, and is bent upwardly at its inner or rear end and secured to a depending plate member 94, whereat a stop-screw 89 is provided. The body of the operating rod or handle 45 slides on the plate 88, and when said rod or handle is returned inwardly or toward the rear by the springs 84, the rear end thereof engages said stop 89 which arrests said rod or handle in its predetermined position for subsequent operation. The inner end of the rod or handle 45 has a depending pin 90 which guides within a slot 91 formed in the plate 88 (Fig. 4), and said pin and slot limit the outward movement of said rod or handle.

The rod or handle 45 has secured on it an upstanding bracket plate 92 against which the adjacent ends of the levers 81 are constantly pressed by means of the springs 84, said ends of said levers being equipped with shoes 93 which have a rocking engagement with the forward face of said plate 92, as indicated in Figs. 12 and 13. The adjoining ends of the levers 81 thus have a constant bearing against the bracket plate 92 which is rigid with the rod or handle 45 and will be pulled outwardly when said rod is pulled outwardly, as shown in Fig. 13, and be retracted inwardly and move the rod 45 inwardly when said rod is released and the springs 84 are permitted to operate through the levers 81 to retract said rod.

Secured to the bracket plate 92 is an upwardly extending and rearwardly deflected reasonably broad leaf spring 99 which is rigid with the rod or handle, and at its upper end, when said rod is at its inner position, engages the lower portion of the hinged coin-plate 83, as shown in Fig. 4, and serves to retain said coin-plate in its operative position for guiding coins from the coin entrance slots to the means mounted on the carriage 80 for receiving said coins. When the operating rod or handle 45 is pulled forwardly, it carries the arm 99 from engagement with the hinged plate 83 and at that time said plate will turn downwardly by gravity, as shown in Figs. 8 and 9, and release any paper or the like that might have become arrested thereon, anything arrested and then released by the plate 83 being discharged downwardly to the front of the coin-box 38 and finding its way to the discharge opening 42.

The sides 85 of the main frame 79 for the operative mechanism are connected at their lower front portions by the transverse bar or plate 86, hereinbefore referred to, at substantially their middle portions by the coin guide and positioning transverse plate 23, which is stationary, at their upper rear portions by a transverse rod 101 which serves to strengthen the frame and as a support for a series of depending shutter plates 182 hinged upon said rod, and at their lower rear portions by a plate 103 which has the downwardly and rearwardly inclined member 94, hereinbefore referred to, and a horizontally extending floor member 104 above which the carriage 80 has its sliding movement and carries the coins fed to the machine.

The series of shutter plates 182 hinged on the rod 101 hang downwardly, as shown in Fig. 4, at the rear of the lower ends of the compartments of the tray 37 and protect the goods in said compartments from being interferred with by a wire which might be inserted upwardly along the chute 41. When the machine is in operation and in the act of ejecting a piece of confection, said piece will move against the shutter plate 182 in line with it and turn said shutter plate rearwardly, as shown in Fig. 8, and after the descent of the ejected piece of confection, as indicated by the dotted lines in Fig. 9, said shutter plate will return to its normal hanging position shown in Fig. 4. The plates 182 are also advantageous in that the ejected pieces of confection are, at their rear ends, tilted downwardly by their engagement with said plates and caused to freely descend into the chute 41.

One of the more important features of the floor or platform section 104 of the connecting plate 103 resides in the special formation thereof and in the provision therein of coin slots 107 down through which the coins finally pass to the coin receptacle 38. The floor section 104 is formed at its forward edge with upwardly inclined concave recesses 106 (Fig. 13) up which coins are moved during the operation of the machine and one of which recesses is in line with each coin slot 107. Rearwardly of the concave recesses 106 the floor section 104 is formed with openings 95 which are of dovetail shape, being wider at their front ends and having downwardly and inwardly beveled rearwardly converging edges and opening into slots 96 at their rear ends, as shown in Fig. 12. These slots 96 are less in length than the final discharge coin slots 107, and directly at the rear of said slots 96 the floor 104 has a series of concave depressions 97 which lead directly into the coin slots 107. When a coin is carried rearwardly over the platform 104, its lower edge rides up the appropriate concave recess 106, and if the movement of the operating rod or handle 45 is continued outwardly without interruption, the coin will continue its movement rearwardly to the coin-slot 107 and be released to escape downwardly through said coin-slot. If, however, the coin should be carried rearwardly to just beyond the rear edge of the concave recess 106 and the operating rod 45 be ceased in movement, the lower edge of the coin, having settled down into the opening 95 at the rear of said recess, will operate as a dog against the rear edge of said recess 106 to prevent return movement of the carriage carrying the coin toward the front of the machine, it being intended that after a coin has started rearwardly under the action of the carriage 80 and on a frontward pull of the operating rod or handle 45, said rod and carriage shall be compelled to make a complete delivery movement before returning to initial position.

As one means for preventing the return movement of the carriage 80 before it has completed its full rearward movement, I provide the openings 95 to receive the lower edges of the coins being transported so that in the event of pulling force being released on the rod or handle 45, said coins will engage the rear edges of the recesses 106 and becoming arrested thereby, arrest the carriage 80 against forward movement. Should the carriage 80 be moved rearwardly to carry the coins beyond the openings 95 and until they reach the slots 96 or concave recesses 97, and the pull on the handle or rod 45 then cease, the front edges of the slots 96 will be engaged by the coins and cooperate therewith to prevent return frontward motion of the carriage 80. I thus utilize the coins transported by the carriage 80 to prevent the return movement of the carriage to its initial position before it has completed its full rearward movement. It may be mentioned that after the coins pass into vertical alignment with the front edges of the openings 95, the upper edges of the coins become engaged by the tray flanges 29, 69 and become depressed thereby so that the lower portions of the coins are compelled at their lower edges to enter the slots 96, and thence pass into the concave recesses 97, whence the coins pass to the slots 107. The only two points at which a coin can be used to prevent reverse frontward movement of the carriage 80 are at the front end of the openings 95 and at the front edge of the slots 96, and of course the purpose of depressing the coins into the openings 95 and slots 96 is to compel a complete rearward movement of said coins and carriage 80. If the pull is relieved from the operating rod or handle 45 before a coin has been carried to its full goods-delivery position, the springs 84, acting on the levers 81, would return the carriage frontwardly except for the provision of the shoulders formed at the front edge of the openings 95 and front edges of the slots 96, which shoulders therefore cooperate with the coins in compelling a full outward stroke of the handle 45 and a complete inward movement of the carriage 80 with each operation of the machine, the coins being held by said carriage until they pass into vertical alignment with the coin slots 107, at which time, by the means hereinafter described, said coins are released to descend through the slots and the carriage 80 is permitted to return to its forward position.

The sides 85 of the mechanism supporting frame 79 have, at their lower portions, studs 113, 114 (Fig. 2), and these studs are utilized in connection with the cheek pieces 40 for supporting the frame 79 in operative position. The upper edges of the cheek pieces 40 have recesses 115 (Fig. 3) to receive the studs 113 and undercut recesses 116 to receive the studs 114. The cheek pieces 40 support the frame 79 and permit of the removal of said frame whenever necessary through the front lower doorway of the casing 30.

The sides 85 of the frame 79 are formed with recesses 117 (Fig. 3) which afford seats for lateral flanges 118 provided on the lower opposite sides of the tray 37, the lower end of said tray below said flanges 118 being passed downwardly between said sides 85 so that the flanges 118 on the tray may engage the edges of said recesses 117.

The carriage 80 comprises a transverse bar 119 which is folded upon itself into approximately the form of a horizontal U, as shown in Figs. 8 and 9, 120 denoting the lower member of the U and 121 the upper member thereof, and which is shown in top elevation in Fig. 16. The lower member 120 of the bar 119 has forwardly extending side plates 122 whose outer edges have portions bent upwardly and outwardly, as at 123, and these portions are set within and slidably enter guide slots 124 formed in the side members 85 of the frame 79. The forward ends of the side members 122 of the carriage 80 have depending pins 125 which, as shown in Fig. 13, are engaged by the slotted outer ends of the levers 81, and said levers when the operating rod or handle 45 is pulled outwardly act against said pins 125 to move the carriage 80 rearwardly whereby the coins are carried against the pieces of confection for the purpose of ejecting them. At its rear portion the transverse bar 119 is cut out at its folded edge to form coin slots 126 (Fig. 16), which slots are in horizontal line with the final coin delivery slots 107 in the table or platform 104. At the rear edge of the transverse bar 119 is secured a plate 127 whose forward edge is flanged upwardly and fastened to the bar 119 by screws, as shown in Fig. 16. The plate 127 is a horizontal plate extending transversely of the machine and moves rearwardly and forwardly with the carriage 80 during the outward movement of the operating rod or handle 45 and also during the inward or return movement of said handle. The side members 122 of the carriage 80 contains slots 128, and at the ends of the upper member 121 of the bar 119 are formed hooks 129.

Upon the carriage 80 is placed a coin tester bar 130, shown in Fig. 17. The bar 130 has frontwardly projecting side members 131, which rest upon the side members 122 of the carriage 80, and the rear edge of the bar 130 has rearwardly projecting sections 132 formed with beveled and rearwardly converging edges 133, the recesses between the sections 132 being below the upper ends of the slots 126 in the transverse bar 119 of the carriage 80, and said sections 132 being at the adjoining ends of the slots 126, (Fig. 11). In use the coin tester bar 130 is interposed between the lower and upper members 120, 121, respectively, of the transverse bar 119, and the side members 131 of said bar 130 rest upon the side members 122 of the carriage 80. The coin tester bar 130 is slidable upon the carriage 80, and to this end the side members 131 of the bar 130 are equipped with depending pins 134, which extend downwardly through the slots 128 in said members 122. The pins 134 and slots 128 are provided to permit the bar 130 to slide with the carriage 80 and also permit the carriage 80 to have a final rearward movement independently of the bar 130 so as to release the coins to descend through the slots 107. At their front ends the side members of the bar 130 are provided with pins 135, and said pins are connected by coiled springs 136 (Fig. 13) with the hooks 129 formed on the carriage. In the normal position of the parts just hereinbefore referred to the coin tester bar 130 is within the fold of the bar 119 of the carriage 80, and the recesses 137 in the rear edge of said bar are below the slots 126 in the carriage bar 119, and said recesses and said slots are immediately at the front vertical plane of the coin-guide and positioning plate 23, as shown in Fig. 4, so that a coin conveyed to the machine may, after passing down the plate 83 and against the front face of the plate 23, enter one of the slots 126 of the carriage 80 and the corresponding recess 137 of the coin tester bar 130, and rest upon two of the projections 132 of said bar 130, as I illustrate in Fig. 4, wherein 139 denotes a coin positioned for effecting the operation of the machine on the outward pull of the handle 45.

When the handle 45 is pulled outwardly with the coin 139 in position, the coin-plate 83 will swing frontwardly by gravity and the edges of the slot 126 of the carriage 80 and corresponding recess 137 of the bar 130, will force or move the coin, while on edge, rearwardly through a recess 22 in the plate 23 and through a recess 26 in the tray plate 27, and against the forward end of the lower piece of confection 61, the continued rearward movement of the coin resulting in the lower piece of confection being moved rearwardly against and opening the shutter 182, as shown in Fig. 8, and finally in said lower piece of confection passing entirely from the tray 37 and descending through the chute 41 to the opening 42 at the lower front portion of the machine. During the rearward movement of the coin 139, the carriage 80 and coin tester bar 130 move together until the carriage has almost completed its rear stroke, and at that time the lower ends of the pins 134 reach the forward edge of the platform 104 (Fig. 13) and become arrested thereby, the arresting of the pins 134 preventing the coin tester plate 130 from having any further rearward movement. At this time, however, the carriage 80 may and does move further rearwardly so that its slots 126 are carried beyond the projections 132 of the bar 130 and directly over the slots 107 in the table or platform 104, which is the condition shown in Fig. 13. The movement of the slots 126 of the carriage 80 beyond the projections 132 of the bar 130 and over the slots 107 results in the coins being released and permitted to descend through said slots 107. When the coins are in the slots 126 of the carriage 80 they are supported by the beveled edges of the projections 132 of the bar 130, and hence when the slots 126 are carried rearwardly beyond said projections 132, the coins become unsupported and freely fall from the slots 126 and through the slots 107, passing to the cash box.

The slots 128 in the carriage members 122, permit the carriage 80 to be moved a limited distance rearwardly independently of the coin-tester plate 130 after said plate 130 has become arrested by the engagement of its pins 135 with the forward edge of the platform 104, and during this additional rearward movement of the carriage 80, the hooks 129 thereof pull against and increase the tension of the springs 136. On the return frontward movement of the carriage 80 under the action of the springs 84 and levers 81, the springs 136 draw the coin-tester plate 130 into the fold of the carriage-bar 119 or to its initial position as soon as the carriage has moved frontwardly the slight distance it previously moved rearwardly beyond the bar 130 when said bar 130 became arrested to relieve its support from the coins.

The rearwardly projecting sections 132 on the coin-tester bar 130 have rearwardly converging side edges and hence the recesses 137 between said sections have rearwardly diverging side edges, which edges support the coins on edge. I preferably give the recesses 137 rearwardly diverging edges so that an improperly small coin may slip down between and from them, while a proper coin will be arrested upon and supported by them. The divergence of the side edges of the recesses 137 is also beneficial in permitting the carriage 80 to carry the coins rearwardly from said recesses with the least disturbance of the coins, at the time the bar 130 becomes arrested and the carriage 80 continues its movement rearwardly to the discharge coin slots 107.

On the first positioning of the coin 139 in the slot 126 of the carriage 80 and in the corresponding recess 137 of the coin tester and support 130, the coin projects downwardly at the front of the platform 104 and in line with one of the upwardly extending concave recesses 106 thereof and thereafter as the carriage 80 and plate 130 are moved rearwardly, the coin rides up the said recess 106, as hereinbefore described, and rearwardly across the platform 104. The elevation of the coin by riding up the recess 106 carries the coin upwardly from the projections 132 bordering the recess 137 in which the coin was initially positioned, and this freedom of the coin in respect to the plate 130 permits the flanges 29, 69 at the bottom of the tray 37 to force the coin downwardly against the top surface of the platform 104 and to compel the coin to pass downwardly, during its rearward movement, into and along an opening 95 of said platform and thence into the slot 96 and then along the depressed portions 97 of the platform and to the slot 107. If therefore the handle 45 should not be given a full outward stroke and the carriage 80 a full rearward stroke, the coin is caused to engage the shoulder formed at the forward edge of the opening 95 or at the forward edge of the slot 96, to compel a full rearward movement of the carriage 80 before the carriage can be returned to its initial position.

When the carriage 80 is arrested by the engagement of the coin with the shoulders on the platfrom 104, the outer ends of the levers 81 maintain their engagement with the carriage but become locked stationary, the springs 84 at that time being unable to move the carriage frontwardly. This locking of the levers 81 in stationary position leaves the operating rod or handle 45 relieved from the pressure of the inner ends of the levers 81 and therefore the handle-bar becomes unrestrained and if moved inwardly and then outwardly it will not affect the carriage 80, said operating rod or handle 45 thus being incapacitated on any inward movement to affect the carriage 80 and only being effective on an outward pull sufficient to engage the inner ends of the levers 81 and force the carriage 80 further inwardly to the end of its full rearward stroke.

In order to facilitate the turning downwardly of the rear end of an ejected piece of confection, as shown in Fig. 8, I make the goods supporting flanges 29, 69 of the tray 27 of reduced length, said flanges not being permitted to extend to the rearward edge of the tray and in length being about two-thirds of the depth of the tray, thus leaving rear end portions of the pieces of confection unsupported. When the flanges 29, 69 are thus shortened, the rear end of the pieces of confection being ejected have a tendency to turn downwardly, and the shutter 182 aids in the tendency of the piece of confection to turn downwardly and prevents said piece from turning upwardly.

The plate 127 carried at the rear edge of the carriage 80 also aids in turning the ejected piece of confection into vertical position for discharge through the chute 41, because the piece of confection after starting downwardly slides over the rear edge of said plate 127 and is prevented from taking any position except one which is substantially vertical and leading into the chute 41 and beyond any part of the mechanism which might tend to affect the descent of the piece of confection.

The depending flange or apron member 94 also aids in directing the ejected pieces of confection down the chute 41.

Should for any reason a piece of confection become lodged on the platform 104 during a previous operation of the machine, said piece on the succeeding operation of the machine would be moved rearwardly by the plate 127 and carriage 80 and be ejected at about the same time that the bottom piece 61 in the tray is at such operation discharged.

The coin-plate 83 is hinged at its upper end on pivot screws 140 to the upper forward corners of the side plates 85, and said plate 83 has a rearwardly inclined straight plate or section 141 and then a lower perpendicular surface or section 142, this section 142 normally standing at the front of and parallel with the coin positioning plate 23, as shown in Fig. 4, and a coin introduced through one of the coin-slots 59 will slide down the downwardly and rearwardly inclined surface 141 of the plate 83 and then pass downwardly between the section 142 of said plate and the plate 23 and enter a slot 126 of the carriage 80 and the recess 137 below the same of the plate 130, taking the position shown in Fig. 4, and thereafter, as will be understood from the description hereinbefore presented, an outward pull on the handle or operating rod 45 will cause the carriage 80 to move rearwardly and carry the coin against the lower piece of confection and effect the discharge of the same, the coin finally passing to and dropping through a slot 107 of the platform 104 and descending to the coin receptacle 38. If the coin introduced to the machine had been defective in diameter, it would have passed downwardly through the slot 126 of the carriage and recess 137 of the plate 130 and descended upon the inclined front top surface of the coin receptacle 38, whence said piece would find its way to the discharge opening 42 at the lower front portion of the main casing, and hence a ten cent piece if introduced to the machine by mistake, when a one cent piece should have been introduced, will be returned to the purchaser.

The coin plate 83 hangs freely and is given its initial position shown in Fig. 4 by the pressure against the same of the arm or plate 99 carried by the handle or operating rod 45. When the handle or rod 45 is pulled outwardly, it carries the plate or arm 99 from the plate 83 and then said plate by gravity swings forwardly, as shown in Figs. 8 and 9, dropping anything that might have been caught thereupon downwardly to the front of the mouth of the coin receptacle 38. The coin-plate 83 will be provided with suitable washer catchers 143 and with magnets 144 for arresting steel disks and the like, and these features need not be specially described, since they are of customary character and are not claimed herein. A special feature of importance connected with the coin plate 83 is the provision on the rear face of the lower section 142 thereof of certain pins shown in Fig. 15 for directing the coins fed through the coin-slots 59 to the foot of the appropriate compartments of the tray 37 from which goods are to be sold. The tray has six compartments for confections 61 and the machine has only three coin slots 59 for the sale of confections from these six compartments, and hence the coins fed to the machine must be directed to the foot of the proper compartment from which the goods are to be sold.

A coin fed through the left hand coin slot, looking at Fig. 1, will pass to the foot of the left hand compartment 62 of the tray 37, and coins successively entered through said left hand coin slot 59 will pass to the foot of the compartment 62 until all of the pieces 61 contained in said compartment have been sold and the arm 78 of the weight 77 in said compartment extends downwardly over the front of the coin positioning and guide-plate 23. Thereafter coins entered through the left hand coin slot 59 will, by means of the beveled edge 24 of said arm 78 and by means of the pins hereinafter referred to carried by the plate 83, be directed to the foot of the compartment 63 until all the goods in that compartment have been sold. Coins entered through the middle coin slot 59 will all pass to the foot of the compartment 64 until all of the goods in that compartment have been sold and the arm 78 of the weight 77 for said compartment has descended over the front portion of the plate 23, as shown in Fig. 11, and thereafter all coins entered through said middle coin slot 59 will be deflected, partly by the said arm 78, to the of compartment 65 until all of the goods in said compartment have been sold. In Fig. 11 I indicate a coin as being deflected by the arm 78 of the weight for the compartment 64, to the foot of the compartment 65 and I number the coin 145, said coin being shown as positioned at the foot of the compartment 65 for use in ejecting the lower piece of goods from said compartment. Coins introduced through the right hand coin slot 59 will pass to the foot of the right hand compartment 67 until all the goods in that compartment have been sold, and thereafter coins introduced through the right hand coin slot 59 will be deflected, as I indicate by the dotted lines 146 in Fig. 11, to the foot of the adjacent compartment 66, until all of the goods in that compartment have been sold. I may thus provide a machine having a capacity of six vertical compartments in the tray with only three entrance slots for coins at the front of the machine.

In Fig. 15 it may be seen that the rear face of the section 142 of the coin-plate 83 is equipped at opposite ends with pins 147, 148, respectively, these pins being short studs which normally engage the coin positioning plate 23 and serve to deflect any coins intended for the two outer tray-compartments 62, 67, respectively, into line with the lower ends of said compartments, a coin striking the pin 147 being turned inwardly thereby and against the adjacent pins 149 which serve to restrain the coin from passing except to the foot of the compartment 62. Properly adjacent to the pin or stud 148 are pins 150 which confine a coin deflected inwardly by the pin 148 to a position in line with the lower end of the compartment 67. All of the coins fed through the left hand coin slot 59 until the goods in the compartment 62 have been sold will be directed to position between the pins 147 and 149, and all of the coins fed to the right hand coin-slot 59 until the goods in compartment 67 have been sold will be directed to position in line with the lower end of the compartment 67 by the pins 148, 150. All of the coins fed through the middle coin-slot 59 will be directed to position at the foot of the compartment 64 until said compartment has become empty, by pins 152, 153. All coins fed to the left hand coin-slot 59 after the compartment 62 has become empty will be deflected by the beveled edge of the arm 78 of the weight 77 for the compartment 62 and the upper pin 149 into position in line with the foot of the adjacent compartment 63, the pin 153 aiding in confining the coins to such position, and hence under this condition the goods will be sold from the compartment 63, the compartment 62 having already been emptied. The coins introduced through the right hand coin-slot 59 after all of the goods in the compartment 67 have been sold will be, by the beveled edge of the arm 78 of the weight 77 for said compartment 67, deflected inwardly toward the left to position between the pins 150 and pin 151 and in line with the lower end of the compartment 66, as shown in Fig. 11, the said arm 78 and the upper pin 150 keeping the coins from entering the space in line with the lower end of the compartment 67 and compelling said coin to move inwardly and become positioned in line with the lower end of the compartment 66, and the pin 151 restraining the coins from moving inwardly beyond their position for the compartment 66. Coins fed through the middle coin-slot 59 will until the compartment 64 has become emptied take their position between the pins 152, 153, this being their normal line of travel, and after the compartment 64 has become emptied, the coins fed through the middle coin slot 59 will be, by the beveled edge of the arm 78 of the weight 77 for the compartment 64, turned toward the right, as shown by dotted lines in Fig. 11, and become positioned in line with the lower end of the compartment 65, being partly directed to such position by the upper pin 152 and confined in such position or prevented from moving beyond said position by the pin 151. The pins just referred to carried by the lower section 142 of the coin-plate 83 cooperate with the arms of the weights 77 in deflecting the coins so that for each slot 59 after one compartment for that slot has been emptied the coin shall thereafter pass to the foot of an adjacent compartment apportioned to the same slot.

I preferably provide the machine with a shutter for closing all of the coin slots 59 after a coin has been entered through one coin slot, utilizing the coin thus introduced as the means for turning the shutter to closure position. The shutter is shown in its several positions in Figs. 5, 6 and 7 and is illustrated in perspective in Fig. 18. The shutter as a whole is numbered 82 and comprises two members 161, 162 forming a V-outline in cross-section and consisting of a plate folded or bent at the angle line 163 to form said V. The member 162 has three frontwardly projecting arms 164 which normally stand across the path of the three coin-slots 59, as shown in Fig. 5 in position to be acted on by coins entered through said slots; and the member 161 has shutter flanges 165 projecting from the edge thereof and normally these flanges hang downwardly as shown in Fig. 5. The metal plate constituting the shutter 82 has, adjacent to each end arm 164, a tubular curl 166 which afford bearings for pins 167 carried by outwardly extending brackets 168 and entering said curl portions 166, whereby the shutter 82 becomes pivotally mounted or hinged at points above the adjacent side plates 85 of the mechanism frame 79. The brackets 168 are secured to the coin-plate 83. At one end the shutter 82 has a flange 169 which is normally free of the upper downwardly and rearwardly inclined edge of the plate 85 below it, as shown in Fig. 5, and which is adapted on the operation of the shutter by a coin to turn over with the shutter and engage the said downwardly and rearwardly inclined edge of said plate 85, as shown in Fig. 6. With reference to Fig. 5 it may be said that when the coin 170 is pushed through a coin slot 59, it will engage one of the fingers 164, whichever one may be below said slot, and turn the shutter 82 over frontwardly from the position in which it is shown in Fig. 5 to that in which it is shown in Fig 6, the shutter flanges 165 then passing below the coin-slots 59 to exclude coins therefrom. When the shutter is turned over by the introduction of the coin 170, the bend 163 of the shutter will rest against the upper edge of the coin-plate 83, and while the machine is in the condition shown in Fig. 6 no further coins can be introduced thereto. In Fig. 6 I show a coin numbered 171 as being partly within one of the coin-slots 59 and meeting a shutter flange 165, which keeps the coin from passing further into the machine. When a coin has been introduced to the machine, as the coin 170 for instance, it will slide down the coin-plate and take its position where I have illustrated a coin 139 in Fig. 4, and thereupon, as hereinbefore explained, the operating handle or rod 45 will be drawn outwardly for the purpose of utilizing the coin as a means for ejecting the lower piece of confection that may be opposite to it. When the handle or operating rod 45 is pulled outwardly and the coin-plate 83 swings forwardly, the flange 169 of the shutter 82 is caused to have a rolling or pivotal motion upwardly and toward the rear on the downwardly inclined upper edge of the side plate 85, this being caused by the fact that the brackets 168 supporting the shutter are carried by the coin-plate 83, and that when the coin-plate 83 turns downwardly and frontwardly the shutter 82 is carried with it on a different arc, leaving said flange 169 as a bearing to turn on the upper edge of the plate 85. This rolling of the flange 169 on the upper edge of the plate 85 results in the shutter being turned over rearwardly from the position shown in Fig. 6 to that shown in Fig. 7, the fingers or arms 164 then passing into slots 175 (Figs. 7 and 15) of the coin-plate 83, and the shutter flanges 165 turning back substantially to their original position. The coin-plate 83 is shown in Fig. 7 as having turned downwardly toward the front during an outward pull of the operating rod or handle 45. When the operating rod or handle 45 is permitted to return inwardly toward the rear, the plate 83 is caused to swing rearwardly to its normal position shown in Figs. 4, 5 and 6 and in doing this the shutter 82 is carried to its normal position shown in Fig. 5. I provide on the side plate 85 a leaf-spring 176 which normally engages the V-angle 163 at one end of the shutter, as shown in Fig. 5, to impart a certain firmness to the shutter holding it in its initial position. When the coin 170 (Fig. 5) is pushed downwardly, the V of the shutter plate 82 passes forwardly from below the end of the spring 176, as shown in Fig. 6, and when the coin-plate 83 is returned to its normal position shown in Figs. 4 and 5, the V-angle 163 of the shutter is carried upwardly from its position shown in Fig. 7 to that shown in Fig. 5, the angle-edge 163 of the shutter being carried upwardly below the spring 176 and to its original position, as shown in Fig. 5.

The operation of the several parts of the machine has hereinbefore been described in detail in connection with the description of the construction and arrangement of said parts. The pieces of confection 61 will be placed in the tray 37 endwise so that the ends of said pieces may project forwardly and rearwardly, respectively, and in this instance I provide six compartments for the stacks of confections. The tray 37 is seated upon the general frame 79 for the coin mechanism and extends downwardly between the sides of said frame, the lower portion of the tray being close to the rear face of the coin positioning plate 23. In the normal position of the parts of the machine, the lower vertical section 142 of the hinged coin-plate 83 is in near relation to the front face of said plate 23 and the pins 147 to 153, respectively, carried by said section 142 project rearwardly across the space between said section 142 and the plate 23. The tray 37 has six compartments for stacks of confection and the machine has only three coin entrance slots 59, and in the use of the machine coins entered through any one coin-slot will be directed to the foot of one compartment of the tray until all the goods have been sold from that compartment and will then be deflected to the foot of an adjacent compartment until all of the goods have been sold therefrom, two of said compartments being thus apportioned to each coin entrance slot. All of the coins fed through the left hand coin-slot 59 will pass directly to the foot of the compartment 62, being there positioned between the pins 147, 149, until all the goods have been sold from that compartment and the weight 77 in that compartment has descended and caused its arm 78 to overhang the plate 23, and thereafter coins fed through said left hand coin-slot will be deflected by the beveled edge of said arm 78 and the upper pin 149 to position at the foot of the adjacent compartment 63, said coins then being located between the pins 149 and pin 153, until all the goods have been sold from said compartment 63. All coins entered through the middle coin-slot 59 will pass to the foot of the compartment 64 and between the pins 152, 153 until all the goods in that compartment have been sold and the weight 77 therein has descended and the arm 78 thereon overhangs the plate 23, as shown in Fig. 11, and thereafter coins fed through said middle coin-slot 59 will be deflected by the beveled edge on said arm 78 and the upper pin 152 to position at the foot of the adjacent compartment 65, being there confined between the pins 152, 151, until all the goods have been sold from said compartment 65. All coins fed through the right hand coin-slot 59 will be directed to the foot of the compartment 67 and between the pins 148, 150 until all the goods in that compartment have been sold and the weight 77 therein has descended and the arm 78 thereon overhangs the plate 23, as shown in Fig. 11, and thereafter coins entered through the right hand coin-slot 59 will be deflected by the beveled edge of said arm 78 to the foot of the compartment 66 and between the pins 150, 151 until all the goods in said compartment 66 have been sold.

The coins entered through the slots 59 pass, as just described, to position at the foot of the respective compartments from which the goods are to be sold, and when a coin has been entered through any slot 59, it will slide down the plate 83 to position, the coin entering one of the slots 126 of the carriage 80 and the corresponding recess 137 of the coin-tester bar 130 and resting on two of the projections 132 of said bar, as shown in Fig. 4. The coin being thus in position, the handle 45 is pulled outwardly to cause the carriage 80 and bar 130 to move rearwardly and carry the coin against the lower piece of confection of a stack thereof for ejecting said piece to descend through the chute 41 to the purchaser. During the outward movement of the handle 45 and rearward movement of the carriage 80 and bar 130 with the coin positioned to act as a goods ejector, said carriage and bar move together until the carriage is approaching the end of its stroke, and at that time the coin-tester bar 130 becomes arrested by the engagement of the pins 134 with the platform 104 and the carriage moves on to a limited extent without said bar, with the result that the coin is carried rearwardly beyond the bar 130 and over a slot 107, through which the coin, then unsupported, will descend to the coin-box. The parts will then return to their normal position under the action of the springs 84 and levers 81, the initial relation of the carriage 80 and coin-tester bar 130 being restored by the springs 136.

A coin introduced through any one of the coin-slots 59 will act against and cause the shutter 82 to close all of said slots, as hereinbefore explained.

The invention presented in this application comprises further improvements on the machine made the subject of my application, Serial Number 372,491, filed April 9, 1920, which has now matured in Patent 1,466,372 dated August 28, 1923, and said improvements are those specifically pointed out in the appended claims of this application. The same general type of machine is shown in both applications but in detail said machines are readily distinguishable from each other. Both machines employ a six column tray apportioned to three coin-entrance slots and both machines have a carriage to receive introduced coins and, on the outward pull of the operating handle, move the coins rearwardly to eject the pieces of goods from the compartments of said tray. In the building of the machine of my aforesaid patent I sought to add to its efficiency and durability and to simplify portions thereof, and produced the present invention. In regard to the carriage for receiving and moving the coins I may call attention to the new construction thereof shown in Figs. 12, 13, 16 and 17, this construction being absent from my aforesaid patent. The platform 104 of this application differs materially from the platform 104 of the aforesaid patent, in that the present platform has the cooperative openings 95, slots 96 and depressions 97 leading to the slots 107, said openings 95 and slots 96 being absent from the platform of my aforesaid patent. The clearing-plate 127 carried by the carriage and movable over the platform 104 is a feature not shown in my aforesaid patent. The coin positioning plate 23 at the front of the lower end of the tray is a feature not shown in my aforesaid patent. In my aforesaid patent I show a hinged convexly curved coin-plate 83 down which the introduced coins slide, and in my present application I show an angular coin-plate 83 having a vertical lower portion 142 carrying the coin deflecting and positioning pins 147 to 153 inclusive (Fig. 15), this construction being absent from my aforesaid patent. The shutter mechanism shown in Figs. 4, 5, 6 and 7 is wholly absent from my aforesaid patent.

The operating handle and the levers actuated therefrom for moving the coin-carrying carriage and its parts are shown in my aforesaid patent, and a coin-carrying carriage having coin-tester means and movable to utilize the coins as goods ejectors is also shown in my aforesaid patent.

I have hereinbefore described the particular details of the machine presented as embodying my invention, and in many respects these details are of importance and add to the value of the machine, but I do not wish to be limited to all of the particular details of form and construction described, since I am well aware that many of these details may be modified within the spirit of my invention and the scope of the appended claims.

What I claim as my invention and desire to secure by Letters-Patent, is:

1. In a coin-controlling vending machine having coin-entrance slots, a vertical tray for holding columns of pieces of the merchandise to be sold and an exposed operating handle, in combination, a horizontally slidable carriage operable from said handle having vertical coin slots therein apportioned to said columns, a transverse bar mounted on said carriage and having at its rear edge recesses aligning with said vertical slots and projections crossing the same to serve as supports for coins standing on edge in said slots and recesses and facing the lower piece of merchandise in said columns and to be moved against and dislodge said pieces when the carriage is operated from said handle, means for arresting said bar at a predetermined point during the operative movement of said carriage and before said movement has ceased whereby said vertical slots are carried beyond said projections and the coins then being unsupported fall from said slots, and springs connecting said bar and carriage and which become stretched when the carriage travels in advance of the bar and act to restore the normal relation of the bar and carriage on the reverse movement of the carriage.

2. In a coin-controlled vending machine having coin-entrance slots, a vertical tray for holding columns of pieces of the merchandise to be sold and an exposed operating handle, in combination, a horizontally slidable carriage operable from said handle having vertical coin slots therein apportioned to said columns, a transverse bar mounted on said carriage and having at its rear edge recesses aligning with said vertical slots and projections crossing the same to serve as supports for coins standing on edge in said slots and recesses and facing the lower pieces of merchandise in said columns and to be moved against and dislodge said pieces when the carriage is operated from said handle, means for arresting said bar at a predetermined point during the operative movement of said carriage and before said movement has ceased whereby said vertical slots are carried beyond said projections and the coins then being unsupported fall from said slots, and springs connecting said bar and carriage and which become stretched when the carriage travels in advance of the bar and act to restore the normal relation of the bar and carriage on the reverse movement of the carriage, said carriage comprising a transverse folded plate through both members of which said vertical slots extend and said transverse bar normally lying between said members.

3. In a coin-controlled vending machine having coin-entrance slots, a vertical tray for holding columns of pieces of the merchandise to be sold and an exposed operating handle, in combination, a horizontally slidable carriage operable from said handle having vertical coin slots therein apportioned to said columns, a transverse bar mounted on said carriage and having at its rear edge recesses aligning with said vertical slots and projections crossing the same to serve as supports for coins standing on edge in said slots and recesses and facing the lower pieces of merchandise in said columns and to be moved against and dislodge said pieces when the carriage is operated from said handle, means for arresting said bar at a predetermined point during the operative movement of said carriage and before said movement has ceased whereby said vertical slots are carried beyond said projections and the coins then being unsupported fall from said slots, and springs connecting said bar and carriage and which become stretched when the carriage travels in advance of the bar and act to restore the normal relation of the bar and carriage on the reverse movement of the carriage, said carriage comprising a transverse folded plate through both members of which said vertical slots extend and which plate has forwardly extending side plates to which the power is applied for giving the carriage its operative and reverse movements, said transverse bar normally lying between said members and having forwardly extending side members resting upon said side plates of the carriage, and said springs being connected at their rear ends with said carriage and at their front ends with said forwardly extending members of said bar.

4. In a coin-controlled vending machine having coin-entrance slots, a vertical tray for holding columns of pieces of the merchandise to be sold and an exposed operating handle, in combination, a horizontally slidable carriage operable from said handle having vertical coin slots therein apportioned to said columns, a transverse bar mounted on said carriage and having at its rear edge recesses aligning with said vertical slots and projections crossing the same to serve as supports for coins standing on edge in said slots and recesses and facing the lower pieces of merchandise in said columns and to be moved against and dislodge said pieces when the carriage is operated from said handle, means for arresting said bar at a predetermined point during the operative movement of said carriage and before said movement has ceased whereby said vertical slots are carried beyond said projections and the coins then being unsupported fall from said slots, a platform over which the coins are carried by said carriage and bar on the operative movement of the same and which platform has in line with the path of each coin a rearwardly extending opening into which the coin may partly settle down, a slot at the rear end of said opening into which the coin may settle, a depressed portion at the rear of said slot and a coin slot at the rear of said depressed portion and down through which the coin escapes at the end of the full operative movement of said carriage, the forward ends of said openings and of the slots into which they directly lead affording shoulders to cooperate with the coins to compel a full operative movement of the carriage before it can return to initial position, and springs connecting said bar and carriage and which act to restore the normal relation of the bar and carriage on the reverse movement of the carriage.

5. In a coin-controlled vending machine having coin-entrance slots, a vertical tray for holding columns of pieces of the merchandise to be sold and an exposed operating handle, in combination, a horizontally slidable carriage operable from said handle having vertical coin slots therein apportioned to said columns, a transverse bar mounted on said carriage and having at its rear edge recesses aligning with said vertical slots and projections crossing the same to serve as supports for coins standing on edge in said slots and recesses and facing the lower pieces of merchandise in said columns and to be moved against and dislodge said pieces when the carriage is operated from said handle, means for arresting said bar at a predetermined point during the operative movement of said carriage and before said movement has ceased whereby said vertical slots are carried beyond said projections and the coins then being unsupported fall from said slots, a platform over which the coins are carried by said carriage and bar and which is below the tray and has slots through which the coins descend at the end of the operative movement of the carriage, a clearing-plate secured to the carriage and which is moved by the carriage over said platform in advance of the travel of the coins over the platform to the slots therein, and springs connecting said bar and carriage and which act to restore the normal relation of the bar and carriage on the reverse movement of the carriage.

6. In a coin-controlled vending machine having coin-entrance slots and a vertical tray for holding columns of pieces of the merchandise to be sold, operative mechanism comprising, in combination, side supporting plates for said mechanism connected by transverse members and having longitudinal slots, a horizontally slidable carriage having vertical coin-slots therein apportioned to said columns and comprising a plate having at its ends forwardly extending plate members whose side portions are bent upwardly and outwardly and are supported and guided in said slots, levers pivotally connected with said plate members, springs acting against said levers to move said carriage forwardly, an operating handle engaged by said levers for turning said levers to move said carriage rearwardly, a transverse bar mounted on said carriage and having at its rear edge edge recesses aligning with said vertical slots and projections crossing the same to serve as supports for coins standing on edge in said slots and recesses and facing the lower pieces of merchandise in said columns and to be moved against and dislodge said pieces when the carriage is operated from said handle, means for arresting said bar at a predetermined point during the operative movement of said carriage and before said movement has ceased whereby said vertical slots are carried beyond said projections and the coins then being unsupported fall from said slots, and springs connecting said bar and carriage and which become stretched when the carriage travels in advance of the bar and act to restore the normal relation of the bar and carriage on the reverse movement of the carriage.

7. In a coin-controlled vending machine having coin-entrance slots, a vertical tray for holding columns of pieces of the merchandise to be sold and an exposed operating handle, in combination, a horizontally slidable carriage operable from said handle having vertical coin slots therein apportioned to said columns, a transverse bar mounted on said carriage and having at its rear edge recesses aligning with said vertical slots and projections crossing the same to serve as supports for coins standing on edge in said slots and recesses and facing the lower pieces of merchandise in said columns and to be moved against and dislodge said pieces when the carriage is operated from said handle, means for arresting said bar at a predetermined point during the operative movement of said carriage and before said movement has ceased whereby said vertical slots are carried beyond said projections and the coins then being unsupported fall from said slots, and springs connecting said bar and carriage and which become stretched when the carriage travels in advance of the bar and act to restore the normal relation of the bar and carriage on the reverse movement of the carriage, the recesses in said transverse bar being open at their rear ends and the projections on said bar defining between them said recesses and at the sides of each recess having rearwardly diverging downwardly and inwardly beveled edges which cross the vertical coin-slot above them.

8. In a coin-controlled vending machine having coin-entrance slots and a vertical tray for holding columns of pieces of the merchandise to be sold, operative mechanism comprising, in combination, side supporting plates for said mechanism, a horizontally slidable carriage having vertical coin-slots and coin supporting means apportioned to said columns and said carriage being adapted when moved rearwardly to carry the coins against the lower pieces of merchandise in said columns and dislodge the same, an operating handle for said carriage, a transversely extending vertical coin-positioning plate at the front of said tray having in its lower edge recesses for the passage of coins moved rearwardly by said carriage, and a downwardly and rearwardly inclined coin-plate for directing coins from the coin entrance slots to said carriage, said coin-plate having a vertical lower portion parallel and cooperating with said coin-positioning plate and having pins for directing the coins to the respective coin-slots of said carriage.

9. In a coin-controlled vending machine having coin-entrance slots and a vertical tray for holding columns of pieces of the merchandise to be sold, operative mechanism comprising, in combination, side supporting plates for said mechanism, a horizontally slidable carriage, having vertical coin-slots and coin supporting means apportioned to said columns and said carriage being adapted when moved rearwardly to carry the coins against the lower pieces of merchandise in said columns and dislodge the same, an operating handle for said carriage, a transversely extending vertical coin-positioning plate at the front of said tray having in its lower edge recesses for the passage of coins moved rearwardly by said carriage, a downwardly and rearwardly inclined coin-plate for directing the coins from the coin-entrance slots to said carriage, said coin-plate having a vertical lower portion parallel and cooperating with said coin-positioning plate, means at the lower end of said coin-plate for directing the coins to the respective coin-slots of said carriage selected for the columns first to be exhausted and means for thereafter deflecting the coins to the slots of said carriage selected for adjacent columns to be sold from, said deflecting means being automatically rendered operable by the emptying of the exhausted columns, whereby a limited number of coin-entrance slots may be utilized for a tray having twice that number of vertical columns of merchandise.

10. In a coin-controlled vending machine having coin-entrance slots and a vertical tray for holding columns of pieces of the merchandise to be sold, operative mechanism comprising, in combination, side supporting plates for said mechanism, a horizontally slidable carriage having vertical coin-slots and coin supporting means apportioned to said columns and said carriage being adapted when moved rearwardly to carry the coins against the lower pieces of merchandise in said columns and dislodge the same, an operating handle for said carriage, a transversely extending vertical coin-positioning plate at the front of said tray having in its lower edge recesses for the passage of coins moved rearwardly by said carriage, a downwardly and rearwardly inclined coin-plate for directing the coins from the coin-entrance slots to said carriage, said coin-plate having a vertical lower portion parallel and co-operating with said coin-positioning plate, means at the lower end of said coin-plate for directing the coins to the respective coin-slots of said carriage selected for the columns first to be exhausted and means for thereafter deflecting the coins to the slots of said carriage selected for adjacent columns to be sold from, said deflecting means being automatically rendered operable by the emptying of the exhausted columns, and comprising weights upon and descending with the columns of merchandise and having forward downwardly extending coin-deflecting arms which pass to the front of said coin-positioning plate as the columns become exhausted, whereby a limited number of coin-entrance slots may be utilized for a tray having twice that number of vertical columns of merchandise.

11. In a coin-controlled vending machine having coin-entrance slots and a vertical tray for holding columns of pieces of the merchandise to be sold, operative mechanism comprising, in combination, side supporting plates for said mechanism, a horizontally slidable carriage having vertical coin-slots and coin supporting means apportioned to said columns and said carriage being adapted when moved rearwardly to carry the coins against the lower pieces of merchandise in said columns and dislodge the same, an operating handle for said carriage, a transversely extending vertical coin-positioning plate at the front of said tray having in its lower edge recesses for the passage of coins moved rearwardly by said carriage, a downwardly and rearwardly inclined coin-plate for directing coins from the coin entrance slots to said carriage, said coin-plate having a vertical lower portion parallel and co-operating with said coin positioning plate, and means for retiring the said coin-supporting means from the coins in advance of the completion of the operative movement of the carriage.

12. In a coin-controlled vending machine having coin-entrance slots and a vertical tray for holding columns of pieces of the merchandise to be sold, operative mechanism comprising, in combination, side supporting plates for said mechanism a horizontally slidable carriage having vertical coin-slots and coin supporting means apportioned to said columns and said carriage being adapted when moved rearwardly to carry the coins against the lower pieces of merchandise in said columns and dislodge the same, an operating handle for said carriage, a transversely extending vertical coin-positioning plate at the front of said tray having in its lower edge recesses for the passage of coins moved rearwardly by said carriage, and a downwardly and rearwardly inclined coin-plate for directing coins from the coin entrance slots to said carriage, said coin-plate having a vertical lower portion parallel and cooperating with said coin-positioning plate and having pins for directing the coins to the respective coin-slots of said carriage, said coin-plate being hinged at its upper forward end and being adapted to swing forwardly from said coin-positioning plate when said handle is pulled forwardly and said handle having means for restoring said coin-plate to operative position when said handle is moved rearwardly to its normal position.

13. In a coin-controlled vending machine having a plurality of coin entrance slots and a vertical tray for holding columns of pieces of merchandise to be sold, operative mechanism comprising, in combination, side supporting plates for said mechanism, a horizontally slidable carriage having coin slots therein apportioned to said columns, an operative handle for moving said carriage to carry the coins held thereby against the lower pieces of merchandise in said columns for ejecting the same, a hinged coin-plate for directing the coins from said coin entrance slots to said carriage and adapted to swing forwardly from said carriage on the operation of said handle, and means carried by said coin-plate for closing said coin entrance slots on and by the introduction of a coin into the machine through any one of said slots, said means comprising a rockable shutter having operating members normally extending in the path for and to be engaged by coins introduced through said slots and shutter members for barring the passage of coins through said slots, said shutter being tiltable by a coin pressed against any one of said operating members, to carry the shutter members across said slots to bar the entrance of coins to the machine.

14. In a coin-controlled vending machine having a plurality of coin entrance slots and a vertical tray for holding columns of pieces of merchandise to be sold, operative mechanism comprising, in combination, side supporting plates for said mechanism, a horizontally slidable carriage having coin slots therein apportioned to said columns, a hinged coin-plate for directing the coins from said entrance slots to said carriage, an operating handle for moving said carriage to carry the coins held thereby against the lower pieces of merchandise in said columns for ejecting the same, said handle normally holding said coin plate in operative position and releasing said plate to swing downwardly when the handle is operated and returning said plate to operative position when the handle returns to normal position, means carried by and rockably mounted on said coin-plate for closing said coin entrance slots upon and by the introduction of a coin into the machine through any one of said slots, said means comprising a substantially V-shaped frame having in one side operating fingers normally extending in the path for and to be engaged by coins introduced through said slots and in the other side shutter members for barring the passage of coins through said slots, said frame being tiltable by a coin pressed against any one of said fingers to carry the shutter members across said slots, and means for reversely tilting said frame on and by the movement of said coin-plate.

15. In a coin-controlled vending machine having a plurality of coin entrance slots and a vertical tray for holding columns of pieces of merchandise to be sold, operative mechanism comprising, in combination, side supporting plates for said mechanism, a horizontally slidable carriage having coin slots therein apportioned to said columns, a hinged coin-plate for directing the coins from said entrance slots to said carriage, an operating handle for moving said carriage to carry the coins held thereby against the lower pieces of merchandise in said columns for ejecting the same, said handle normally holding said coin plate in operative position and releasing said plate to swing downwardly when the handle is operated and returning said plate to operative position when the handle returns to normal position, means carried by and rockably mounted on said coin-plate for closing said coin entrance slots upon and by the introduction of a coin into the machine through any one of said slots, said means comprising a substantially V-shaped frame having in one side operating fingers normally extending in the path for and to be engaged by coins introduced through said slots and in the other side shutter members for barring the passage of coins through said slots, said frame being tiltable by a coin pressed against any one of said fingers to carry the shutter members across said slots, and means for reversely tilting said frame on and by the movement of said coin-plate and comprising a flange on one end of said frame engaging the upper edge of one of said side plates and serving as a fulcrum point for turning said frame when said handle is operated and the coin-plate swings downwardly.

Signed at New York city, in the county of New York and State of New York, this 16th day of November, A. D. 1922.

HARVEY GILES.